United States Patent
Matsuda et al.

(10) Patent No.: US 8,462,808 B2
(45) Date of Patent: Jun. 11, 2013

(54) INFORMATION SERVER AND COMMUNICATION APPARATUS

(75) Inventors: Makoto Matsuda, Aisai (JP); Yuji Sato, Nagoya (JP); Kazuma Aoki, Kasugai (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 1471 days.

(21) Appl. No.: 11/217,430

(22) Filed: Sep. 2, 2005

(65) Prior Publication Data

US 2006/0045084 A1 Mar. 2, 2006

(30) Foreign Application Priority Data

Sep. 2, 2004 (JP) .................................. 2004-256329
Sep. 30, 2004 (JP) .................................. 2004-289133

(51) Int. Cl.
*H04L 12/43* (2006.01)

(52) U.S. Cl.
USPC ......................................................... 370/460

(58) Field of Classification Search
None
See application file for complete search history.

(56) References Cited

U.S. PATENT DOCUMENTS

| | | | |
|---|---|---|---|
| 5,426,637 A * | 6/1995 | Derby et al. | 370/401 |
| 5,619,594 A * | 4/1997 | Melen | 382/233 |
| 5,684,962 A * | 11/1997 | Black et al. | 709/238 |
| 6,930,798 B1 * | 8/2005 | Kaneko | 358/1.9 |
| 7,167,255 B1 * | 1/2007 | Mikami et al. | 358/1.15 |
| 7,227,651 B2 * | 6/2007 | Kamiya | 358/1.14 |
| 7,251,370 B2 * | 7/2007 | Labelle | 382/239 |
| 7,260,084 B2 * | 8/2007 | Saller | 370/352 |
| 7,272,629 B2 | 9/2007 | Yamaura et al. | |
| 7,330,677 B2 * | 2/2008 | Ogura | 399/88 |
| 7,353,390 B2 * | 4/2008 | Chandley et al. | 713/168 |
| 7,426,563 B2 | 9/2008 | Morita et al. | |
| 7,574,522 B2 * | 8/2009 | Oguchi | 709/238 |
| 2002/0004899 A1 | 1/2002 | Azuma | |
| 2002/0188867 A1 * | 12/2002 | Bushey et al. | 713/201 |
| 2003/0212892 A1 | 11/2003 | Oishi | |

(Continued)

FOREIGN PATENT DOCUMENTS

| JP | 07-067088 A | 3/1995 |
|---|---|---|
| JP | 10-091554 A | 4/1998 |

(Continued)

OTHER PUBLICATIONS

Patent Abstracts of Japan—English translation of JP10-327197, published Dec. 8, 1998.

(Continued)

*Primary Examiner* — John Blanton
(74) *Attorney, Agent, or Firm* — Banner & Witcoff, Ltd.

(57) ABSTRACT

A communication apparatus as one of first communication apparatuses belonging to a first communication network, for communicating with another of the first communication apparatuses via the first communication network, and with one or more second communication apparatuses via a second communication network, the communication apparatus as the one first communication apparatus including a communication portion which communicates with the different first communication apparatus via the first communication network, and with the one or more second communication apparatuses via the second communication network, and a control portion which controls the communication portion to communicate with the different first communication apparatus via the first communication network, in a first control manner, and controls the communication portion to communicate with the one or more second communication apparatuses via the second communication network, in a second control manner different from the first control manner.

40 Claims, 23 Drawing Sheets

U.S. PATENT DOCUMENTS

| | | | | |
|---|---|---|---|---|
| 2004/0111529 A1* | 6/2004 | Parmar | | 709/245 |
| 2004/0190635 A1* | 9/2004 | Ruehle | | 375/253 |
| 2004/0243850 A1* | 12/2004 | Oishi | | 713/201 |
| 2006/0012824 A1* | 1/2006 | Uchikawa | | 358/1.15 |
| 2008/0307079 A1* | 12/2008 | Choi et al. | | 709/223 |

FOREIGN PATENT DOCUMENTS

| | | |
|---|---|---|
| JP | 10-327197 A | 12/1998 |
| JP | 2000-224354 | 8/2000 |
| JP | 2000349803 | 12/2000 |
| JP | 2002-024147 A | 1/2002 |
| JP | 2002-185931 A | 6/2002 |
| JP | 2002217965 | 8/2002 |
| JP | 2003-015665 | 1/2003 |
| JP | 2003-330827 | 11/2003 |
| JP | 2004032699 | 1/2004 |

OTHER PUBLICATIONS

Patent Abstracts of Japan—English translation of JP07-067088, published Mar. 10, 1995.

Patent Abstracts of Japan—English translation of JP2002-185931, published Jun. 28, 2002.

Patent Abstracts of Japan—English translation of JP10-091554, published Apr. 10, 1998.

* cited by examiner

FIG.2A

FIELDS OF CONTENT TABLE

| | |
|---|---|
| CONTENT ID | 51a |
| RECORD STATUS | 51b |
| DATE AND TIME | 51c |
| USER | 51d |
| INPUT PORTION | 51e |
| SECURITY ATTRIBUTE | 51f |
| ELECTRONIC WATERMARK INFORMATION | 51g |
| FUNCTION SORT | 51h |
| INDIVIDUAL FUNCTION ATTRIBUTE | 51i |
| DATA ID | 51j |
| KEYWORD ID | 51k |

FIG.2B

FIELDS OF DATA TABLE

| | |
|---|---|
| DATA ID | 53a |
| REFERENCE NUMBER | 53b |
| DATA TYPE | 53c |
| DATA SIZE | 53d |
| ACTUAL DATA | 53e |

FIG.2C

FIELDS OF KEYWORD TABLE

| | |
|---|---|
| KEYWORD ID | 55a |
| KEYWORD | 55b |
| PLACE | 55c |
| OCCURRENCE NUMBER | 55d |
| COLOR | 55e |
| SISE | 55f |

FIG.3

| KEYWORD ID | KEYWORD | RESTRAINED NETWORK | | | PLACE | COLOR | OCCURRENCE NUMBER | SIZE |
|---|---|---|---|---|---|---|---|---|
| | | LAN | VPN | WAN | | | | |
| 001 | PARTNER'S SECRET | N | Y | Y | Any | Any | 1 | Any |
| 002 | CORPORATE SECRET | N | N | Y | Any | Any | 1 | Any |
| 003 | TRADE SECRET | N | Y | Y | H,F | Red | 1 | Any |
| 004 | CONFIDENTIAL | N | N | Y | H,F | Red | 1 | Any |
| 005 | TECHNICAL REPORT | N | N | Y | Any | Any | 1 | 12pt |
| 006 | PATENT | N | Y | Y | Any | Any | 2 | Any |
| 007 | PRINTER | N | N | Y | Any | Any | 3 | Any |

| ADDRESS SORT | PREFFIX |
|---|---|
| LINK LOCAL | fe80:0000:0000:0000 |
| SITE LOCAL | fec0:0000:0000:**** |
| GLOBAL | 2***::/64 OR 3***::/64(MOST SIGNIFICANT 3 BITS ARE 001) |

FIG.14A
COMMUNICATION IN LOCAL-AREA NETWORK(LINK LOCAL)

| ADDRESSER | GLOBAL | | LOCAL | |
|---|---|---|---|---|
| ADDRESSEE | GLOBAL | LOCAL | GLOBAL | LOCAL |

FIG.14B
COMMUNICATION IN LOCAL-AREA NETWORK(SITE LOCAL)

| ADDRESSER | GLOBAL | | SITE LOCAL | |
|---|---|---|---|---|
| ADDRESSEE | GLOBAL | SITE LOCAL | GLOBAL | SITE LOCAL |

FIG.14C
COMMUNICATION BETWEEN INSIDE AND OUTSIDE OF LOCAL-AREA NETWORK

| ADDRESSER | GLOBAL |
|---|---|
| ADDRESSEE | GLOBAL |

FIG.18A (FIRST SET INFORMATION)

| RESTRAINED ADDRESS | SET INFORMATION |
|---|---|
| GLOBAL ADDRESS | enable |
| SITE LOCAL ADDRESS | enable |

FIG.18B (SECOND SET INFORMATION)

| RESTRAINED FUNCTION | SET INFORMATION |
|---|---|
| LPR/LPD | enable |
| EWS | disable |
| FTP | enable |

INFORMATION SERVER AND COMMUNICATION APPARATUS

The present application is based on Japanese Patent Application No. 2004-256329 filed on Sep. 2, 2004 and Japanese Patent Application No. 2004-289133 filed on Sep. 30, 2004, the contents of which are incorporated herein by reference.

BACKGROUND OF THE INVENTION

1. Field of the Invention

The present invention relates to an information server which has a function of storing information and serves the stored information in response to a request from a terminal. The present invention also relates to a communication apparatus that is connected to a local-area network and a wide-area network.

2. Related Art Statement

Generally, a communication band of the Internet is narrower than that of an in-company network. Therefore, when information is served to both the Internet and the in-company network, two servers are used, that is, a first server that holds one or more files suitable for the Internet, and a second server that holds one or more files suitable for the in-company network, and each file for the Internet is reduced in size as compared with each file for the in-company network (for example, a resolution of an image represented by a file for the Internet is lowered as compared with that of an image represented by a file for the in-company network).

However, the use of two servers leads to increasing the cost of hardware. This problem may be solved by a method disclosed by, e.g., Japanese Patent Application Publication No. 2002-217965 or its corresponding U.S. patent application Publication No. 2003/0212892A1. In this method, an information server as an addresser measures a bandwidth of a transmission line between the server and a communication apparatus as an addressee, selects a codec corresponding to the measured bandwidth, and transmits information using the selected codec.

However, in the case where the method disclosed by the above-indicated patent document is applied to a single server that is connected to two communication lines or networks, e.g., a WAN (wide-area network) and a LAN (local-area network), the following problems may arise:

Though WAN has not only the problem that the bandwidth thereof is narrower than that of LAN, but also another problem that a security level (e.g., a degree of protection of information from tapping or modifying) of the transmission line of WAN is lower than that of LAN, those problems cannot be solved by the disclosed method. In addition, since the disclosed method needs to carry out the steps of dynamically measuring a bandwidth of a transmission line between the server and each one of a plurality of communication apparatuses and selecting a codec corresponding to the measured bandwidth, the overhead of communication needed to measure the bandwidth is not negligible, i.e., the loss of communication is so large that the method cannot be applied to a large-scale communication system.

Meanwhile, the Internet has been known as a wide-area network. As is well known in the art, the Internet Protocol (IP) is used in communicating with a computer (i.e., a communication apparatus or a terminal) connected to the Internet. Since, however, depletion of the address resources has become a serious problem, there is a plan to adopt a new internet protocol, i.e., IPv6 (the Internet Protocol version 6). According to this protocol, a plurality of IP addresses, e.g., a local IP address and a global IP address can be allotted to each terminal connected to the Internet.

Here, it can be assumed that a plurality of communication networks are constituted by a plurality of terminals to each of which a local IP address and a global IP address are allotted. When communication is carried out using a local IP address, a packet does not go out through a router connected to the Internet. Thus, a communication network that is located at a level lower than the router, functions as a local-area network. On the other hand, when communication is carried out using a global IP address, a packet goes out through the router. Thus, each terminal connected to the above-indicated local-area network also functions as a terminal connected to a communication network belonging to the Internet, i.e., a low-level network belonging to the Internet.

IPv6 has an additional feature that a protocol according to which each terminal can automatically determine its own addresses is integrated therewith. More specifically described, each communication apparatus that operates according to IPv6 can automatically determine a local IP address and a global IP address therefor, without waiting user's manual setting of the addresses, and thereby automatically connect the each apparatus itself to a local-area network and the Internet.

Since, however, a communication apparatus that operates according to IPv6 has a function of automatically connecting the apparatus itself to a wide-area network (i.e., the Internet), as described above, the apparatus may be detrimentally connected to a wide-area network (the Internet), against user's intention not to connect.

Here, it is assumed that a communication apparatus employs, e.g., a printer portion that is connected to the Internet. Generally, the printer portion is used in a local-area network only. However, in the case where the Internet is managed according to IPv6, it is needed to employ IPv6 as a communication protocol for the printer portion as well.

However, if the printer portion that operates according to IPv6 is connected to a local-area network located at a level lower than a router connected to a wide-area network (the Internet), the printer portion is automatically placed in a condition in which the printer portion can communicate with a terminal connected to the wide-area network located at a level higher than the router, so that the printer portion may be unfairly used by one or more persons other than one or more proper users.

Meanwhile, Japanese Patent Application Publication No. 2004-32699 discloses, as a method of restraining, in the environment of IPv6-managed networks, communications with persons other than proper users and protecting the privacy of the proper users, a method using a public key. According to this method, the above-indicated unfair use of the communication apparatus (e.g., the printer portion) can be prevented by using the public key.

However, the above-indicated method of using the public key to prevent the communications with the improper persons, has other problems that a great operation load is applied to the communication apparatus so as to deal with the public key and it is needed to provide an public key server in the IPv6-managed network.

If the printer portion is connected to an independent network that is physically isolated from a wide-area network, the printer portion can be used in the local-area network only, without needing to use the public key, while the unfair use of the printer portion by the terminals connected to the wide-area network can be prevented. However, recently, there has been known a printer portion having, e.g. a web-server function. That is, there has been known a printer portion having not only a function that is mainly aimed at use in a local-area network only, but also a function that is aimed at use in a wide-area network (the Internet). In this case, the printer portion cannot be physically isolated from the wide-area network.

Communications may be prevented by finding and discarding, with, e.g., a router, packets directed to one or more pre-selected terminals in a network. In this case, however, the management of the network becomes cumbersome and complicated.

SUMMARY OF THE INVENTION

It is therefore an object of the present invention to provide a communication apparatus that is free of at least one of the above-identified problems. It is another object of the present invention to provide an information server that is connected to a plurality of communication networks having different bandwidths or different protection levels and can deal with at least one problem proper to a specific one of the networks. It is another object of the present invention to provide a communication apparatus that can easily restrain, with a small operation load, communications with other communication apparatuses outside a local-area network in the state in which the apparatus is connected to a wide-area network.

According to a first aspect of the present invention, there is provided a communication apparatus as one of first communication apparatuses belonging to a first communication network, for communicating with an other of the first communication apparatuses via the first communication network, and with at least one second communication apparatus via a second communication network, the communication apparatus as the one first communication apparatus comprising a communication portion which communicates with the other first communication apparatus via the first communication network, and with the at least one second communication apparatus via the second communication network, and a control portion which controls the communication portion to communicate with the other first communication apparatus via the first communication network, in a first control manner, and controls the communication portion to communicate with the at least one second communication apparatus via the second communication network, in a second control manner different from the first control manner.

In the present communication apparatus, the control portion controls the communication portion to communicate with another first communication apparatus via the first communication network, in a first control manner, and controls the communication portion to communicate with the second communication apparatus via the second communication network, in a second control manner different from the first control manner. For example, the first communication network may be a local-area network having a wide bandwidth and/or a high security level; and the second communication network may be a wide-area network (e.g., the Internet) having a narrow bandwidth and/or a low security level. The local-area network may, or may not, belong to the wide-area network. Thus, the control portion may include (A) a compressing portion which, when the wide-area network is used to transmit information, compresses the information, and which, when the local-area network is used to transmit the information, does not compress the information, and/or (B) a protecting portion which, when the wide-area network is used to transmit information, protects the information, and which, when the local-area network is used to transmit the information, does not protect the information. Since the control portion operates in the different control manners corresponding to the different communication networks, respectively, the present communication apparatus can be easily and conveniently used. In the case where the local-area network belongs to the wide-area network, the control portion may include an extracting portion which, when the communication portion receives a communication signal from an arbitrary one of the other first communication apparatus and the at least one second communication apparatus, extracts, from the received communication signal addresser identifying information identifying the arbitrary communication apparatus as an addresser; an addresser judging portion which judges whether the addresser identified by the extracted addresser identifying information belongs to at least one second local-area network which belongs to the wide-area network and to which the at least one second communication apparatus belongs and the first communication apparatuses do not belong; and a restraining portion which, when the addresser judging portion judges that the addresser belongs to the at least one second local-area network, restrains the communication portion from communicating with the addresser. In this case, the restraining portion do not restrain, when the addresser judging portion judges that the addresser belongs to the first local-area network, the communication portion from communicating with the addresser.

According to a second aspect of the present invention, there is provided an information server for serving, by transmission, information to each of a plurality of terminals, the information server comprising a communication portion including a plurality of sorts of communication interfaces which are adapted to be connected to a plurality of communication networks, respectively, which have respective different bandwidths and to which the plurality of terminals are connected, respectively; a storing portion which stores the information to be transmitted to the each terminal; and a compressing portion which reads the information from the storing portion and, when a first sort of communication interface of the plurality of sorts of communication interfaces is used to transmit the read information, compresses the read information so that the first sort of communication interface transmits the compressed information to a corresponding first one of the terminals via a corresponding first one of the communication networks, and when a second sort of communication interface different form the first sort of communication interface is used to transmit the read information, does not compress the read information so that the second sort of communication interface transmits the read information as it is, to a corresponding second one of the terminals via a corresponding second one of the communication networks.

The information server in accordance with the second aspect of the present invention can compress information to be transmitted from the communication interface connected to a communication network that would have a narrow bandwidth. Thus, one of the problems proper to a specific sort of communication network, i.e., a problem that a long time is needed to communicate with a terminal via a communication network having a narrow bandwidth, can be solved. To this end, the information server is configured such that whether to compress information or not depends on the sort of the communication interface used. Thus, the information server does not need to do any communications to measure respective bandwidths with respect to other communication networks, and is free of the problem of overhead caused by those communications. That is, the present invention can be applied to a large-scale information-server system.

According to a third aspect of the present invention, there is provided an information server for serving, by transmission, information to each of a plurality of terminals, the apparatus comprising a communicating portion having a plurality of sorts of communication interfaces which are adapted to be connected to a plurality of communication networks, respectively, which have respective different security levels and to which the plurality of terminals are connected, respectively; a storing portion which stores the information to be transmitted to the each terminal; a protecting portion which reads the information from the storing portion and, when a first sort of communication interface of the plurality of sorts of communication interfaces is used to transmit the read information, protects the read information so that the first sort of communication interface transmits the protected information to a corresponding first one of the terminals via a corresponding first one of the communication networks and, when a second sort of communication interface different from the first sort of communication interface is used to transmit the read information, does not protect the read information so that the second sort of communication interface transmits the read information as it is, to a corresponding second one of the terminals via a corresponding second one of the communication networks.

The information server in accordance with the third aspect of the present invention can protect information to be transmitted from the communication interface connected to a communication network that would have a low security level. Thus, one of the problems proper to a specific sort of communication network, i.e., a problem that information may be stolen or modified while being transmitted through a communication network having a low security level, can be solved. In addition, depending upon a manner in which information is protected, a user of the first terminal may be restrained from utilizing the information. Thus, rights of the person who provides the information can be protected, which leads to enhancing people to provide more sorts of information.

According to a fourth aspect of the present invention, there is provided a communication apparatus as one of a plurality of first communication apparatuses belonging to a first local-area network as one of a plurality of low-level networks which belong to a wide-area network and include, in addition to the first local-area network, at least one second local-area network to which a plurality of second communication apparatuses belong and the first communication apparatuses do not belong, wherein a plurality of different first local-area addresses are allotted to the plurality of first communication apparatuses, respectively, so as to identify the first communication apparatuses from each other, and a plurality of different second local-area addresses are allotted to the plurality of second communication apparatuses, respectively, so as to identify the second communication apparatuses from each other, wherein a plurality of different wide-area addresses are allotted to the first and second communication apparatuses, respectively, so as to identify the first and second communication apparatuses from each other, and wherein each of the first and second communication apparatuses includes a communication portion which, when the each communication apparatus as a first addresser sends a first communication signal to a first arbitrary one of the communication apparatuses belonging to one of the first and second local-area networks to which the each communication apparatus belongs, adds, as first addresser identifying information identifying the first addresser, an arbitrary one of (a) one of the first and second local-area addresses that is allotted to the each communication apparatus and (b) the wide-area address allotted to the each communication apparatus, to the first communication signal, and which, when the each communication apparatus as a second addresser sends a second communication signal to a second arbitrary one of the communication apparatuses belonging to an other of the first and second local-area networks to which the each communication apparatus does not belong, adds, as second addresser identifying information identifying the second addresser, (b) the wide-area address allotted to the each communication apparatus, to the second communication signal. The communication apparatus as the one first communication apparatus comprises a corresponding one of the respective communication portions of the first communication apparatuses; an extracting portion which, when the one communication portion receives a third communication signal from a third arbitrary one of the first and second communication apparatuses, extracts, from the received third communication signal, third addresser identifying information identifying the third arbitrary communication apparatus as a third addresser; an addresser judging portion which judges whether the extracted third addresser identifying information is any one of the wide-area addresses; and a restraining portion which, when the addresser judging portion judges that the extracted third addresser identifying information is one of the wide-area addresses, restrains the one communication portion from communicating with the third addresser.

The communication apparatus in accordance with the fourth aspect of the present invention is connected to a network that functions as one of a plurality of low-level networks or sub-networks that cooperate with each other to constitute a wide-area network, and also functions as a local-area network. That is, the present communication apparatus as one of a plurality of first communication apparatuses is connected, together with another or other first communication apparatuses, to each of a first local-area network and a wide-area network including, as one of its sub-networks, the first local-area network. The sub-networks include, in addition to the first local-area network, at least one second local-area network to which a plurality of second communication apparatuses are connected.

Different first local-area addresses are allotted to the first communication apparatuses, respectively, so as to identify them from each other, and different second local-area addresses are allotted to the second communication apparatuses, respectively, so as to identify them from each other. In addition, different wide-area addresses are allotted to the first and second communication apparatuses, respectively, so as to identify them from each other.

In the case where the above-indicated networks are managed by IPv6, local-area addresses may be link local addresses, site local addresses, or unique local addresses, and wide-area addresses may be global IP addresses, site local addresses, or unique local addresses. Since, however, a wide-area network should be wider than a local-area network, local-area addresses and wide-area addresses should be combined such that the local-area addresses are used for a network narrower than a network for which the wide-area addresses are used.

Each one of the first and second communication apparatuses includes a communication portion which communicates, using either a local-area address or a wide-area address, with an arbitrary one of the other communication apparatuses belonging to a corresponding one of the first and second local-area networks or belonging to the wide-area network. More specifically described, the communication portion of the present communication apparatus as one of the first communication apparatuses communicates, using either a local-area address or a wide-area address, with an arbitrary one of the other first communication apparatuses, and communicates, using a wide-area address, with an arbitrary one of the second communication apparatuses belonging to the second local-area network which belongs to the wide-area network and to which the first communication apparatuses do not belong.

More specifically described, when the above-indicated each communication apparatus as a first addresser sends a first communication signal to a first arbitrary one of the communication apparatuses belonging to one of the first and second local-area networks to which the each communication apparatus belongs, the communication portion thereof adds, as first addresser identifying information identifying the first addresser, an arbitrary one of (a) one of the first and second local-area addresses that is allotted to the each communication apparatus and (b) the wide-area address allotted to the each communication apparatus, to the first communication signal and, when the each communication apparatus as a second addresser sends a second communication signal to a second arbitrary one of the communication apparatuses belonging to an other of the first and second local-area networks to which the each communication apparatus does not belong, the communication portion thereof adds, as second addresser identifying information identifying the second addresser, (b) the wide-area address allotted to the each communication apparatus, to the second communication signal. The above-described communication portion or means of each communication apparatus may be one that operates according to IPv6, but it is by no means limited to that.

The communication apparatus as one of the first communication apparatuses comprises a corresponding one of the respective communication portions of the first communication apparatuses. The communication apparatus in accordance with the fourth aspect of the present invention further comprises the following elements: an extracting portion which, when the one communication portion receives a communication signal from an arbitrary one of the first and second communication apparatuses, extracts, from the received communication signal, addresser identifying information identifying the arbitrary communication apparatus as an addresser; an addresser judging portion which judges whether the extracted addresser identifying information is any one of the wide-area addresses; and a restraining portion which, when the addresser judging portion judges that the extracted addresser identifying information is one of the wide-area addresses, restrains the one communication portion from communicating with the addresser.

Thus, the communication apparatus in accordance with the fourth aspect of the present invention can restrain its communications with the addressers using the respective wide-area addresses allotted thereto. Therefore, the present communication apparatus can prevent itself from being unfairly used by the second communication apparatuses belonging to the one or more second local-area networks to which the present communication apparatus does not belong. Since this effect is obtained without needing to introduce, e.g., a special server into the local-area networks or the wide-area network, or modify, e.g., a router to be able to restrain those communications, the present invention is more advantageous than the previously-described prior art.

The concept of the present invention is applicable to not only one-to-one communications but also multi-cast (or broad-cast) communications. Since the present communication apparatus judges whether to restrain or reject an access, based on addresser identifying information added to the access, the apparatus can prevent unfair accesses each without information identifying an addressee, such as the multi-cast (or broad-cast) communications. In addition, the present apparatus enjoys such an advantage that a load of operation needed to restrain unfair accesses is less than that needed to deal with the previously-described public keys. Thus, present communication apparatus can easily restrain communications with the second communication apparatuses located outside the first local-area network to which the present apparatus belongs.

According to a fifth aspect of the present invention, there is provided a communication apparatus as one of a plurality of first communication apparatuses belonging to a first local-area network as one of a plurality of low-level networks which belong to a wide-area network and include, in addition to the first local-area network, at least one second local-area network to which a plurality of second communication apparatuses belong and the first communication apparatuses do not belong, wherein a plurality of different first local-area addresses are allotted to the plurality of first communication apparatuses, respectively, so as to identify the first communication apparatuses from each other, and a plurality of different second local-area addresses are allotted to the plurality of second communication apparatuses, respectively, so as to identify the second communication apparatuses from each other, wherein a plurality of different wide-area addresses are allotted to the first and second communication apparatuses, respectively, so as to identify the first and second communication apparatuses from each other, and wherein each of the first and second communication apparatuses includes a communication portion which, when the each communication apparatus sends a first communication signal to a first arbitrary one of the communication apparatuses belonging to one of the first and second local-area networks to which the each communication apparatus belongs, adds, as first addressee identifying information, an arbitrary one of (a) one of the first and second local-area addresses that is allotted to the first arbitrary communication apparatus as a first addressee and (b) the wide-area address allotted to the first arbitrary communication apparatus, to the first communication signal, and which, when the each communication apparatus sends a second communication signal to a second arbitrary one of the communication apparatuses belonging to an other of the first and second local-area networks to which the each communication apparatus does not belong, adds, as second addressee identifying information, (b) the wide-area address allotted to the second arbitrary communication apparatus as a second addressee, to the second communication signal. The communication apparatus as the one first communication apparatus comprises a corresponding one of the respective communication portions of the first communication apparatuses; an extracting portion which, when the one communication portion receives a third communication signal from a third arbitrary one of the first and second communication apparatuses, extracts, from the received third communication signal, third addressee identifying information identifying the one first communication apparatus as a third addressee; an addressee judging portion which judges whether the extracted third addressee identifying information is any one of the wide-area addresses; and a restraining portion which, when the addressee judging portion judges that the extracted third addressee identifying information is one of the wide-area addresses, restrains the one communication portion from communicating with the third arbitrary communication apparatus.

The communication apparatus in accordance with the fifth aspect of the present invention comprises a corresponding one of the respective communication portions of the first communication apparatuses; an extracting portion which, when the one communication portion receives a communication signal from an addresser as an arbitrary one of the first and second communication apparatuses, extracts, from the received communication signal, addressee identifying information identifying the present communication apparatus as an addressee; an addressee judging portion which judges whether the extracted addressee identifying information is any one of the wide-area addresses; and a restraining portion which, when the addressee judging portion judges that the extracted addressee identifying information is one of the wide-area addresses, restrains the one communication portion from communicating with the addresser. The communication apparatus in accordance with the fifth aspect of the present invention may be independent of the communication apparatus in accordance with the fourth aspect of the present invention, i.e., may be operated irrespective of the presence or absence of addresser identifying information.

According to the fifth aspect of the present invention, each of the first and second communication apparatuses includes a communication portion which, when the each communication apparatus sends a first communication signal to a first arbitrary one of the communication apparatuses belonging to one of the first and second local-area networks to which the each communication apparatus belongs, adds, as first addressee identifying information, an arbitrary one of (a) one of the first and second local-area addresses that is allotted to the first arbitrary communication apparatus as a first addressee and (b) the wide-area address allotted to the first addressee, to the first communication signal, and which, when the each communication apparatus sends a second communication signal to a second arbitrary one of the communication apparatuses belonging to an other of the first and second local-area networks to which the each communication apparatus does not belong, adds, as second addressee identifying information, (b) the wide-area address allotted to the second arbitrary communication apparatus as a second addressee, to the second communication signal. Therefore, when the present communication apparatus as one of the first communication apparatuses receives a communication signal from an arbitrary one of the second communication apparatuses belonging to the second local-area network to which the present communication apparatus does not belong, the received communication signal must include, as the addressee identifying information, the wide-area address allotted to the present communication apparatus as the addressee.

Thus, the present communication apparatus can restrain its communications with the addressers using the wide-area address allotted to the present apparatus. Therefore, the present apparatus can prevent itself from being unfairly used by the second communication apparatuses belonging to the one or more second local-area networks to which the present apparatus does not belong. Since this effect is obtained without needing to introduce, e.g., a special server into the local-area networks or the wide-area network, or modify, e.g., a router to be able to restrain those communications, the present invention is more advantageous than the previously-described prior art. In addition, the present communication apparatus enjoys such an advantage that a load of operation needed to restrain unfair accesses is less than that needed to deal with the previously-described public keys. Thus, present communication apparatus can easily restrain communications with the second communication apparatuses located outside the first local-area network to which the present apparatus belongs.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 2A is an illustrative view for explaining various fields of a content table that is stored by a data storing portion of the multi-function apparatus;

FIG. 2B is an illustrative view for explaining various fields of a data table that is stored by the data storing portion;

FIG. 2C is an illustrative view for explaining various fields of a keyword table that is stored by the data storing portion;

FIG. 3 is an illustrative view for explaining a secret keyword table that is stored by a set-data storing portion of the multi-function apparatus;

FIG. 14A is a table showing a relationship between sorts of addresses that can be used as an addresser address and sorts of addresses that can be used as an addressee address, the relationship corresponding to communications in a same local-area network (link local);

FIG. 14B is a table showing a relationship between sorts of addresses that can be used as an addresser address and sorts of addresses that can be used as an addressee address, the relationship corresponding to communications in a same local-area network (site local);

FIG. 14C is a table showing a relationship between sorts of addresses that can be used as an addresser address and sorts of addresses that can be used as an addressee address, the relationship corresponding to communications between the inside and the outside of a local-area network;

FIG. 18A is an illustrative view of a constitution of first set information that is stored by an NVRAM of the multi-function apparatus;

FIG. 18B is an illustrative view of a constitution of second set information that is stored by the NVRAM;

DETAILED DESCRIPTION OF THE PREFERRED EMBODIMENTS

Hereinafter, there will be described preferred embodiments of the present invention by reference to the drawings.

Figure 1:
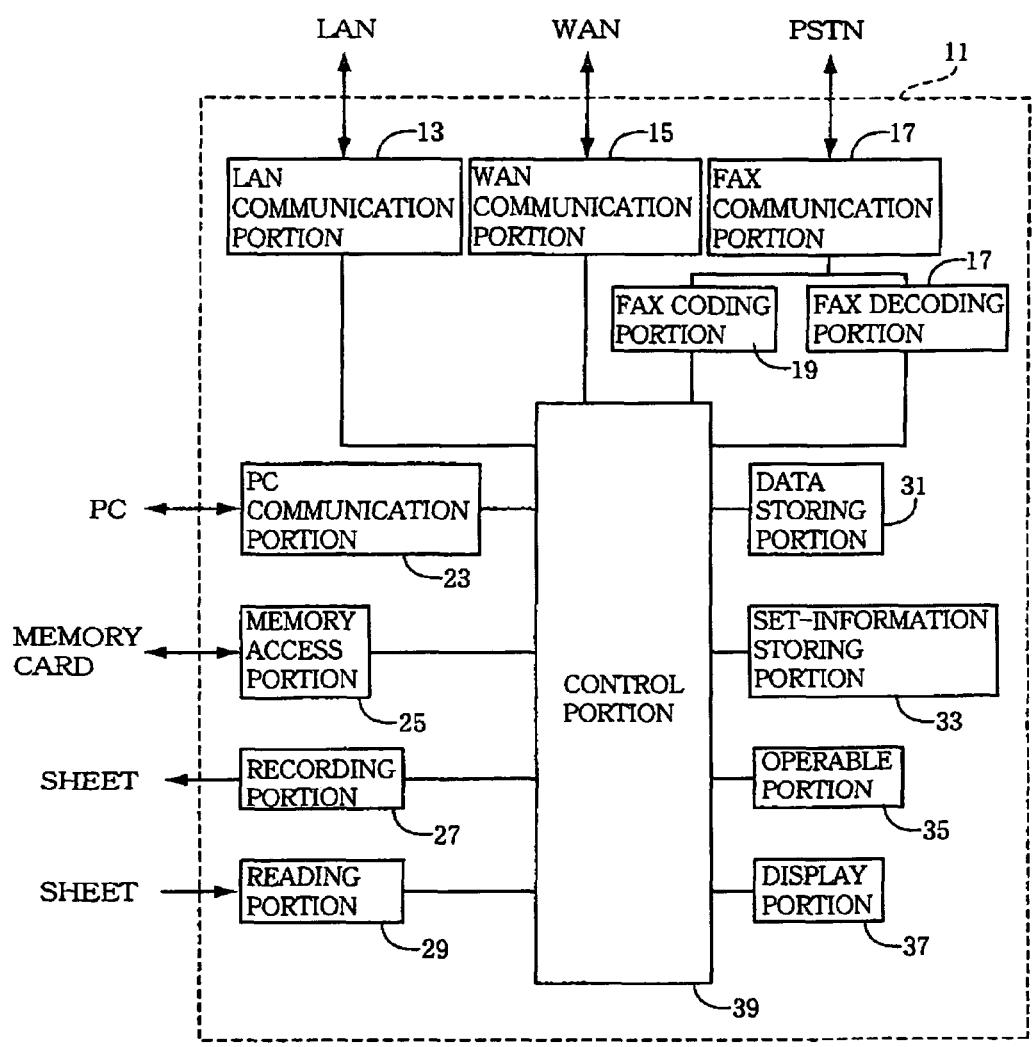
FIG. 1 is a diagrammatic view for explaining a general construction of a multi-function apparatus (MFA) to which the present invention is applied.

FIG. 1 is a diagrammatic view for explaining a general construction of a multi-function apparatus 11 (MFA) 11 functioning as a communication apparatus or an information server in accordance with the present invention. The multi-function apparatus 11 includes a WAN (wide-area network) communication portion 15 as a first sort of communication interface, a LAN (local-area network) communication portion 13 as a second sort of communication interface, a FAX facsimile) communication portion 17, a FAX coding portion 19, a FAX decoding portion 21, a PC (personal computer) communication portion 23, a memory access portion 25, a recording portion 27, a reading portion 29, a data storing portion 31, a set-data storing portion 33, an operable portion 35, a display portion 37, and a control portion 39.

The LAN communication portion 13 is connected to a LAN and communicates with other communication apparatuses or terminals connected to the LAN. The WAN communication portion 15 is connected to a WAN (e.g., the Internet) and communicates with other communication apparatuses or terminals connected to the WAN. In addition, the WAN communication portion 15 processes (e.g., codes and decodes) data related to a VPN (virtual private network), and sends, to the control portion 39, information identifying a VPN communication.

The FAX communication portion 17 is connected to a PSTN (public switched telephone network), and sends coded data received from the FAX coding portion 19, to other communication apparatuses or terminals connected to the PSTN, and sends data received from the other terminals, to the FAX decoding portion 21.

The FAX coding portion 19 codes, according to a facsimile standard, data received from the control portion 39, and sends the coded data to the FAX communication portion 17.

The FAX decoding portion 21 decodes the data coded according to a facsimile standard and received from the FAX communication portion 17, into data that can be processed by the control portion 39, and sends the decoded data to the control portion 39.

The PC communication portion 23 has a function of communicating, based on a command received from the control portion 39, with a PC, by utilizing a communication standard such as a USB standard or an IEEE 1394 standard.

The memory access portion 25 gains, based on a command received from the control portion 39, access to a memory card as a sort of recording or storing medium, and reads data from the memory card or writes data on the card.

The recording portion 27 has a function of recording, based on a command received from the control portion 39, an image on a recording sheet as a sort of recording medium in a recording method such as a laser-transcription method or an inkjet method.

The reading portion 28 has a function of reading, based on a command received from the control portion 39, an image recorded on a recording sheet by using imaging elements such as CCDs (charge-coupled devices), and obtaining image data representing the read image.

The data storing portion 31 is constituted by, e.g., a hard disc and, based on a command received from the control portion 39, the portion 31 stores data or allows the stored data to be read out therefrom. The data storing portion 31 includes a content table that stores attribute data representing one or more attributes of inputted data; and a data table that stores inputted data per se; and a keyword table that stores keyword information as a portion of inputted data. For example, when the multi-function apparatus 11 receives FAX data as a sort of inputted data, the content table stores attribute data representing one or more attributes of the FAX data; the data table stores the FAX data per se (i.e., image data); and the keyword table stores one or more keywords present in the FAX data. The keyword data stored by the keyword table are obtained by first subjecting the FAX data (the image data) to an OCR (optical character recognition) process, then subjecting the thus obtained sentences to a syntax analysis, and finally extracting one or more keywords according to a predetermined rule. This is also the case with other sorts of inputted data such as printing data. However, when character codes are directly received as inputted data, the inputted data are not subjected to the OCR process. The content table, the data table, and the keyword table will be detailed later.

The set-data storing portion 33 stores data that are set, by user's operation of, e.g., the operable portion 35, about the various functions of the multi-function apparatus 11. The set-data storing portion 33 is constituted by, e.g., a flash memory. The set data include secret keyword data that will be detailed later.

The operable portion 35 includes a touch panel that is an integral portion of a display screen of the display portion 37; and mechanical keys that are provided around the display portion 37. The operable portion 35 is operable by the user to input various commands.

The display portion 37 is constituted by, e.g., a liquid-crystal display (LCD) or an organic EL (electroluminescence) display, and displays information according to a command supplied from the control portion 39.

The control portion 39 is essentially constituted by a microcomputer including a CPU, a ROM, a RAM, an SRAM, an I/O port, and a bus line for connecting those elements to each other. The control portion 39 controls, according to control programs stored by the ROM, the above-described various portions in an integrated manner and carries out various sorts of operations.

FIGS. 2A, 2B, and 2C illustratively show the content table, the data table, and the keyword table, respectively, that are stored by the data storing portion 31. Each of the three tables includes various data fields, described below.

FIG. 2A illustratively shows the various fields of the content table. More specifically described, the content table includes a content ID field 51a, a record status field 51b, a date and time field 51c, a user field 51d, an input portion field 51e, a security attribute field 51f, an electronic watermark information field 51g, a function sort field 51h, an individual function attribute field 51i, a data ID field 51j, and a keyword ID field 51k.

The content ID field 51a is for storing an ID (identification) that identifies a record from other records. As records are generated, those records are given respective IDs having an ascending order.

The record status field 51b is for storing information representing a status of a record, i.e., a locked state (i.e., an updating-inhibiting state), a deleted or canceled state, or a pending state.

The date and time field 51c is for storing a date and a time when a record is generated.

The user field 51d is for storing information that identifies a user who has inputted data. Therefore, in the case where a user who has inputted data cannot be specified, the user field 51d remains empty with respect to the inputted data.

The input portion field 51e is for storing information that identifies an input portion that has been used to input data. The input portion is an arbitrary one of the LAN communication portion 13, the WAN communication portion 15, the FAX communication portion 17, the PC communication portion 23, the memory access portion 25, and the reading portion 29. If the input portion is any one of the LAN communication portion 13, the WAN communication portion 15, and the FAX communication portion 17, then the field 51e stores information that identifies a transmitter that transmits the data to the input portion; such as an IP (internet protocol) address of a PC, or a facsimile number of a FAX machine.

The security attribute field 51f is for storing information representing a degree of secrecy of data, i.e., a first degree that data are fully open; a second degree that data are open within a company only; a third degree that data are open to a partner(s) only; and a fourth degree that data are fully secret.

The electronic watermark information field 51g is for storing a code that is produced based on a serial number allotted to the multi-function apparatus 11 and a date and a time stored in the date and time field 51c.

The function sort field 51h is for storing a sort of a function, i.e., an arbitrary one of a printer function, a copier function, a FAX transmitter function, a FAX receiver function, a PC-FAX transmitter function, a scanner function, a media-print function, a media-store function, and a mail-transfer function.

The individual function attribute field 51i is for storing attributes of each individual function. For example, with respect to the FAX transmitter function, the field 51i stores a mode in which data are transmitted; a magnification at which data are transmitted; a resolution at which an image is read; layout information; information representing whether an image is monochromatic or colored; addressee information; and a resolution(s) at which an addressee can output an image.

The data ED field 51j is for storing an ID that identifies inputted data, and thereby specifies inputted data that are stored in the data table.

The keyword ID field 51k is for storing an ID that identifies keyword data, and thereby specifies keyword data that are stored in the keyword table.

FIG. 2B illustratively shows the various fields of the data table that stores inputted data. The data table includes a data ID field 53a, a reference number field 53b, a data type field 53c, a data size field 53d, and an actual data field 53e.

The data ID 53a is for storing IDs that identify individual records from each other, and corresponds to the data ID field 51j of the above-described content table.

The reference number field 53b is for storing a total number of records in the content table that refer to each of the above records.

The data type field 53c is for storing a type of inputted data, e.g., printing data, FAX data, JPEG data, or text data.

The data size field 53d is for storing a size of inputted data.

The actual data field 53e is for storing inputted data per se.

FIG. 2C illustratively shows the various fields of the keyword table that stores keyword data contained by inputted data. The keyword table includes a keyword ID field 55a, a keyword field 55b, a place field 55c, an occurrence number field 55d, a color field 55e, and a size field 55f.

The keyword ID 55a is for storing IDs that identify respective records from each other, and corresponds to the keyword ID field 51k of the above-described content table.

The keyword field 55b is for storing one or more keywords per se. For example, various words such as "secret", "patent", or "customer information" can be adopted as keywords.

The place field 55c is for storing one or more places where the keyword or keywords occurs or occur in a document or data, i.e., information representing a place such as a header, a text, or a footer.

The occurrence number field 55d is for storing a number of occurrences of each keyword in data.

The color field 55e is for storing a color of image(s) of each keyword.

The size field 55f is for storing a size (i.e., a point number) of character(s) of each keyword.

FIG. 3 illustratively shows a secret keyword table showing the secret keyword data stored by the set-data storing portion 33. That is, the secret keyword data are stored as a table by the storing portion 33, and each record is constituted by a keyword ID 61a, a keyword 61b, an access-restrained network CLAN) 61c, an access-restrained network (VPN) 61d, an access-restrained network (WAN) 61e, a place 61f, a color 61g, an occurrence number 61h, and a size 61i.

The keyword ID 61a is an ID that univocally identifies a secret keyword, and is automatically allotted to the secret keyword, in an ascending manner, when the secret keyword is inputted.

The keyword 61b is the secret keyword that requires that a file containing the keyword be judged as a secret file or data.

The access-restrained network (LAN) 61c is a flag indicating whether, in the case where a network to which a requesting terminal is connected is LAN, the terminal's access to the data containing the keyword 61b should be restrained. More specifically described, if this flag is set at "N", then the access is allowed and the data containing the keyword 61b are transmitted to the terminal. On the other hand, if the flag is set at "Y", then the access is restrained and a predetermined operation is carried out.

The access-restrained network (VPN) 61b is a flag indicating whether, in the case where a network to which a requesting terminal is connected is VPN, the terminals access to the data containing the keyword 61b should be restrained.

The access-restrained network (WAN) 61c is a flag indicating whether, in the case where a network to which a requesting terminal is connected is WAN, the terminal's access to the data containing the keyword 61b should be restrained.

The place 61f is an access-restraining condition with respect to a place where a secret keyword is present in a document. For example, if the place 61f is set at "ANY", then the access to the data containing the keyword 61b is restrained anywhere the keyword 61b may be; if the place 61f is set at "H", then only the access to the data containing the keyword 61b present in the header is restrained; and if the place 61f is set at "F", then only the access to the data containing the keyword 61b present in the footer is restrained.

The color 61g is an access-restraining condition with respect to a color of a secret keyword present in a document. For example, if the color 61g is set at "ANY", then the access to the data containing the keyword 61b is limited irrespective of whichever sort of color the keyword 61b may have; and if the color 61g is set at "Red", then only the access to the data containing the keyword 61b whose color is red is restrained.

The occurrence time 61h is an access-restraining condition with respect to a number of occurrences of a secret keyword to a document. For example; if the occurrence time 61h is "1", then the access to the data containing at least one occurrence of the keyword 61b is restrained; and if the occurrence time 61h is set at "3", then only the access to the data containing at least three occurrences of the keyword 61b is restrained.

The size 61i is an access-restraining condition with respect to a character size (point number) of a secret keyword present in a document. For example, if the size 61i is set at "12 pt", then the access to the data containing the keyword 61b whose character size is not smaller than 12 point is restrained; and if the size 61i is set at "ANY", then the access to the data containing the keyword 61b is restrained irrespective of whichever character size the keyword 61b may have.

The general construction of the multi-function apparatus 11 as the information server has been descried heretofore. As is apparent from the foregoing description, the LAN communication portion 13 as the second sort of communication interface and the WAN communication portion 15 as the first sort of communication interface function as a communication portion; the data storing portion 31 functions as a storing portion; and the control portion 39 functions as each of a compressing portion, a protecting portion, and a router portion. Each of the LAN communication portion 15, the WAN communication portion 15, and the operable portion 35 can function as each of a compression-degree receiving portion, a compression-stop-command receiving portion, and a protection-stop-command receiving portion. In particular, each of the LAN communication portion 13 and the WAN communication portion 15 can function as each of those receiving portions when the each portion 13, 15 receives a command from a terminal connected to a corresponding one of the local-area network (LAN) and the wide-area network (WAN). In addition, the recording portion 27 functions as a printer portion; the reading portion 29 functions as a scanner portion; and the FAX communication portion 17 functions as a facsimile machine.

Next, there will be described various operations that are carried out by the control portion 39. However, the following description is focused on only operations that are carried out in connection with a viewing request from a terminal, and does not relate to operations that are carried out by common multi-function devices having an information-storing function. The operations described below are as follows: (1) Viewing Operation, (2) Viewing Image Producing Operation Called during the Viewing Operation, and (3) Secret Keyword Checking Operation Called during the Viewing Image Producing Operation.

(1) Viewing Operation

First, a viewing operation will be described by reference to a flow chart shown in FIG. 4. The viewing operation is started by the control portion 39, when the control portion 39 receives, from a terminal connected to the LAN or the WAN, any sort of viewing request.

First, at Step T105, the control portion 39 judges whether the terminal is requesting a logging-in image. If a positive judgment is made, the control of the control portion 39 goes to Step T110; and, if not, the control goes to Step T115.

Figure 8:
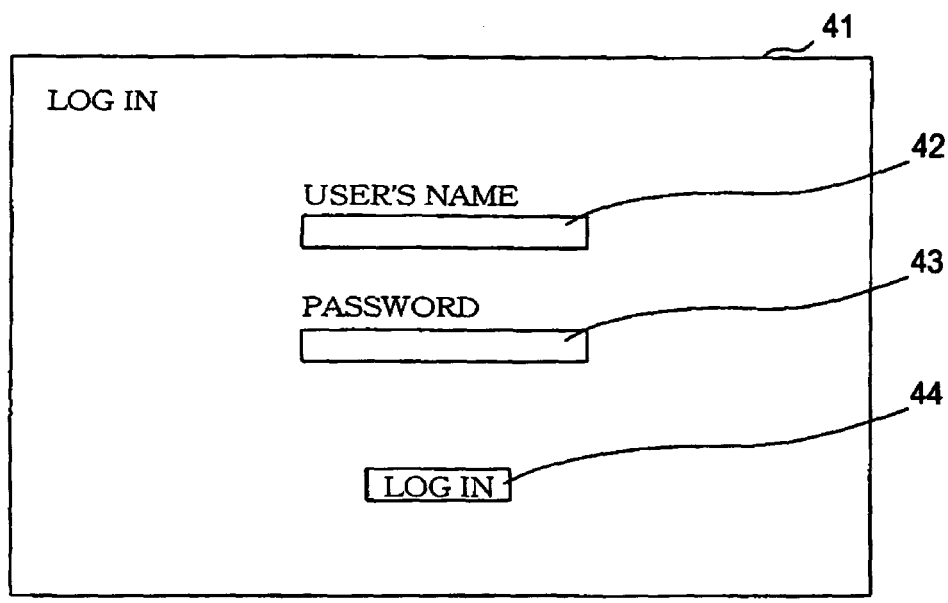
FIG. 8 is an illustrative view for explaining a logging-in image that is displayed on a screen of a terminal as a communication apparatus.

At Step T110, the control portion 39 produces the logging-in image. Then, the control goes to Step T165. FIG. 8 shows an example of the logging-in image 41 that is displayed on a screen of the terminal. The logging-in image 41 has a user's name text box 42, a password text box 43, and a log-in command button 44. The user's name text box 42 is used by a user of the terminal to input his or her name; and the password text box 43 is used by the user to input a password. The log-in command button 44 is used by the user to send a log-in request to the multi-function apparatus 11.

Figure 4:
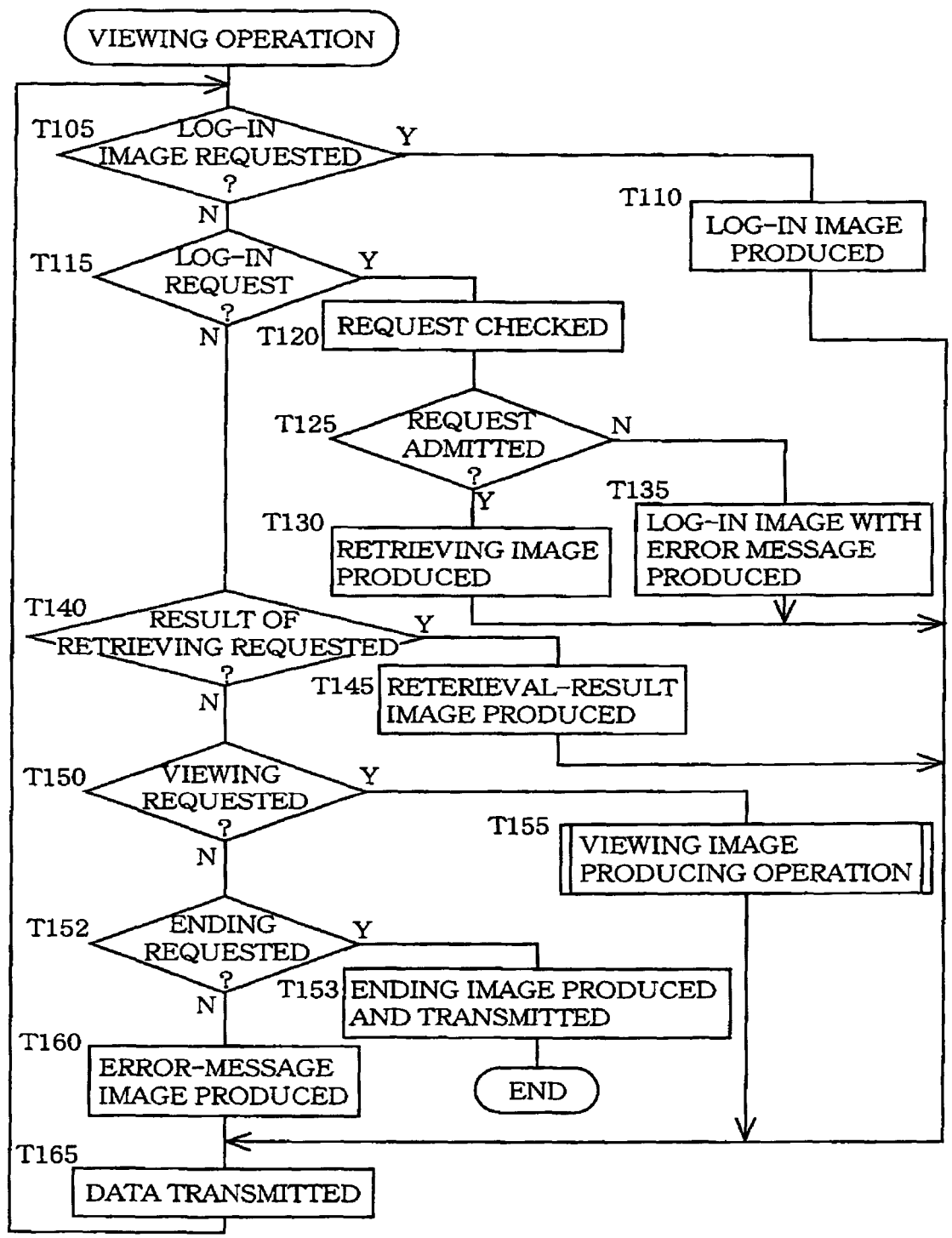
FIG. 4 is a flow chart for explaining a viewing operation that is carried by a control portion of the multi-function apparatus.

Back to the flow chart of FIG. 4, at Step T115, the control portion 39 judges whether the terminal is sending a log-in request. If a positive judgment is made, the control goes to Step T120; and if not, the control goes to Step T140.

At Step T120, the control portion 39 checks the log-in request. More specifically described, the control portion 39 receives the user's name and the password that have been inputted through the logging-in image displayed by the terminal and judges whether the combination of the user's name and the password received is identical with the combination of a user's name and a password stored by the set-data storing portion 33.

Step T120 is followed by Step T125 to judge whether the log-in request has been allowed. If a positive judgment is made, the control goes to Step T130; and if not, the control goes to Step T135.

Figure 9:
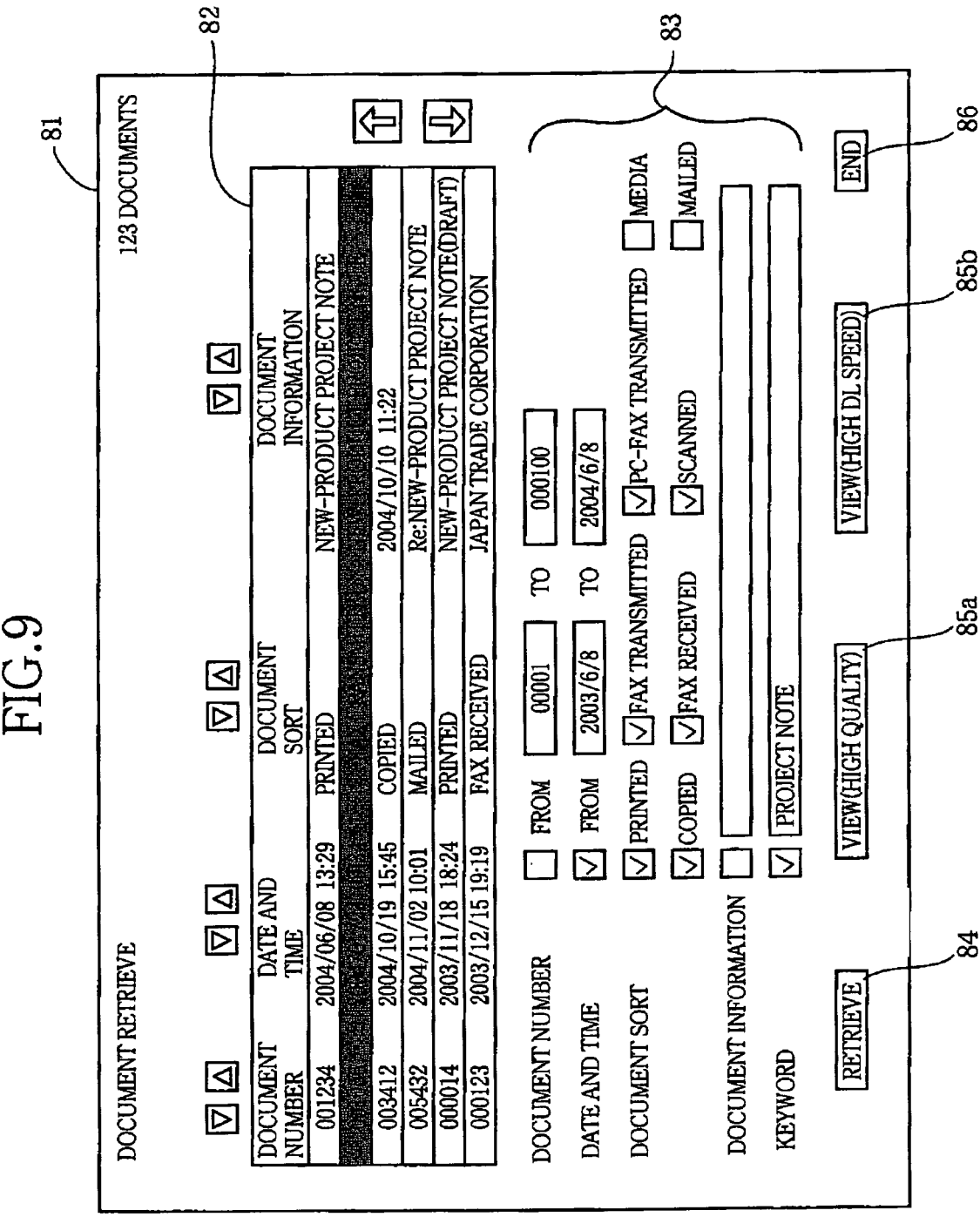
FIG. 9 is an illustrative view for explaining a document-retrieving image that is displayed on the screen of the terminal.

At Step T130, the control portion 39 produces a document-retrieving image. Then, the control goes to Step T165. FIG. 9 shows an example of the document-retrieving image 81 that is displayed on the screen of the terminal. The retrieving image 81 has a grid 82, a group of condition input boxes 83, a retrieval command button 84, a viewing (high quality) command button 85a, a viewing (high DL (download) speed) command button 85b, and an end command button 86. The grid 82 shows one or more sets of document-related information that are related to one or more documents and each of which includes a number allotted to a corresponding one of the documents; a date and a time when the document was recorded; a sort of the document (e.g., a printed document, a FAX-transmitted document, or a copied document); and document data (e.g., a title of the document, or a name of a person who used the document). Thus, an arbitrary one of the documents can be selected based on the grid 82. The condition input boxes 83 are used by the user to input one or more conditions to select desired documents (i.e., desired sets of document-related information) displayed in the grid 82. If the user selects and inputs at least one of a document number, a date and a time, a document sort, document data, and a keyword, and then clicks the retrieval command button 84, the total number of the documents to be displayed in the grid 82 can be reduced. That is, the retrieval command button 84 is for reducing the total number of the documents to be displayed in the grid 82, according to the conditions indicated by the condition input boxes 83. The viewing (high quality) command button 85a is for viewing, in a high-quality mode, the documents displayed in the grid 82; and the viewing (high DL speed) command button 85b is for reading, in a high DL speed mode, the documents displayed in the grid 82. The end command button 86 is for ending the displaying of the document-retrieving image 81.

Back to the flow chart of FIG. 4, at Step T135 to which the control goes when a negative judgment is made at Step T125, the control portion 39 produces the logging-in image with an error message. Then, the control goes to Step T165. The logging-in image with the error message means that the logging-in image produced at Step S110 additionally includes such a message that the log-in request has been rejected. However, no examples of the logging-in image with the error message are shown.

At Step T140 to which the control goes when a negative judgment is made at Step T115, the control portion 39 judges whether the terminal requests a result of the retrieval, that is, judges whether the user has clicked the retrieval command button 84 in the retrieving image 81 shown in FIG. 9. If a positive judgment is made, the control goes to Step T145; and if not, the control goes to Step T150.

At Step T145, the control portion 39 retrieves one or more documents according to the condition or conditions inputted through the condition input boxes 83 in the retrieving image 81 shown in FIG. 9, and produces a retrieval-result image indicating the result of the retrieval. Then, the control goes to Step T165. The retrieval-result image is similar to the retrieving image shown in FIG. 9, except that the contents of the grid 82 are updated, i.e., only the documents corresponding to the conditions inputted in the condition input boxes 83 are displayed in the grid 82.

Back to the flow chart of FIG. 4, at Step T150 to which the control goes when a negative judgment is made at Step T140, the control portion 39 judges whether the terminal is sending a viewing request, that is, judges whether either one of the viewing (high quality) command button 85a and the viewing (high DL speed) command button 85b has been clicked. If a positive judgment is made, the control goes to Step T155; and if not, the control goes to Step T152.

At Step T155, the control portion 39 carries out a viewing image producing operation to produce a viewing image. The viewing image producing operation will be described later. Then, the control goes to Step T165.

At Step T152 to which the control goes when a negative judgment is made at Step T150, the control portion 39 judges whether the terminal is requesting an ending operation. If a positive judgment is made, the control goes to Step T153; and if not, the control goes to Step T160.

At Step T153, the control portion 39 produces an ending image, transmits the ending image to the terminal and ends the current (i.e., viewing) operation. It is preferred that the ending image include a log-out message. However, no examples of the ending image including the message are shown.

At Step T160 to which the control goes when a negative judgment is made at Step T152, the control portion 39 produces an error-message image, and then goes to Step T165. It is preferred that the error-message image include such a message that an erroneous request has been received. However, no examples of the error-message image are shown.

At Step T165, the control portion 39 transmits, to the requesting terminal, the image produced at each of Steps T110, T130, T135, T145, T155 and T160, and then the control goes back to Step T105.

(2) Viewing Image Producing Operation

Figure 5:
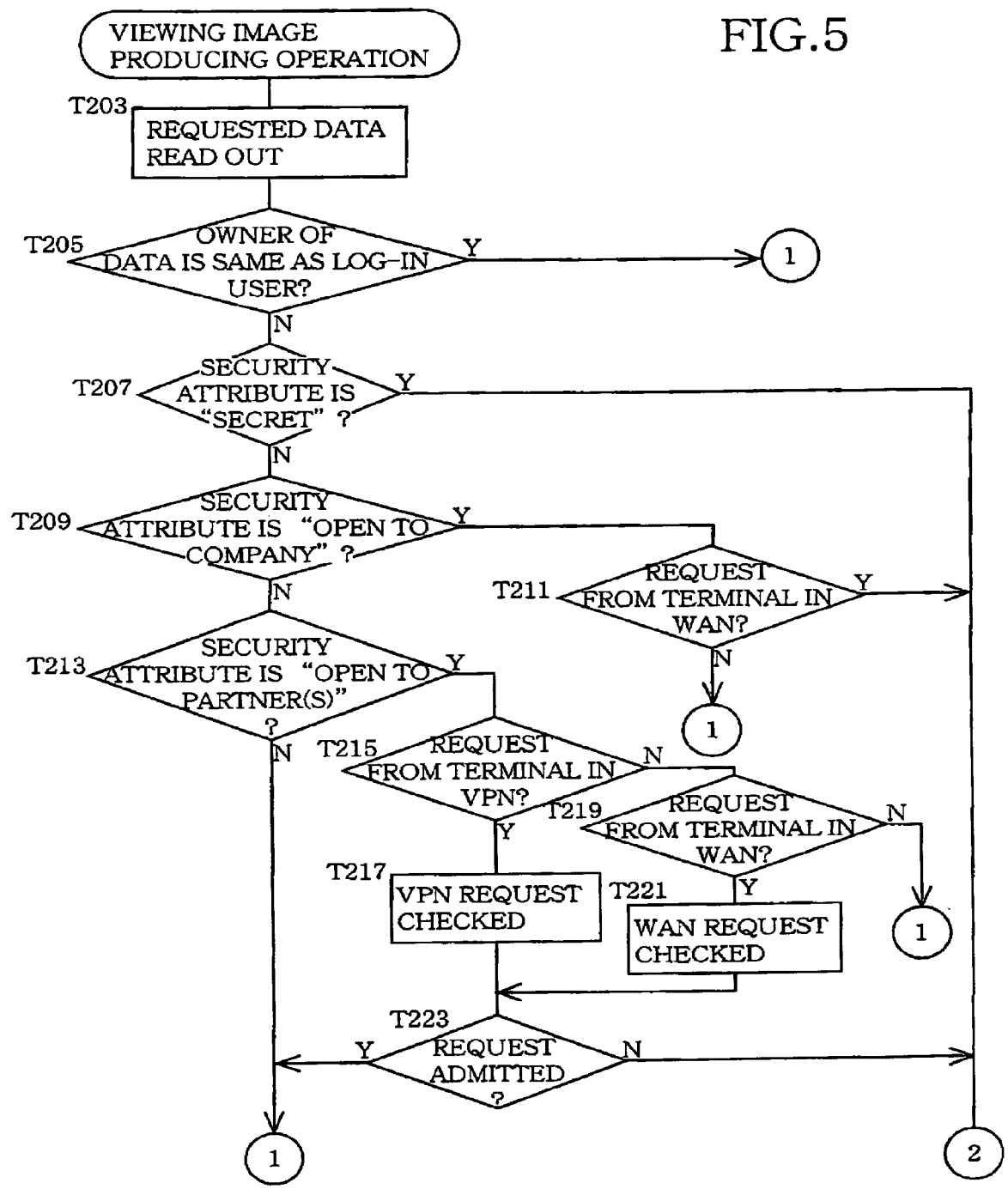
FIG. 5 is a flow chart for explaining a first portion of a viewing-image producing operation that is carried by the control portion.
Figure 6:
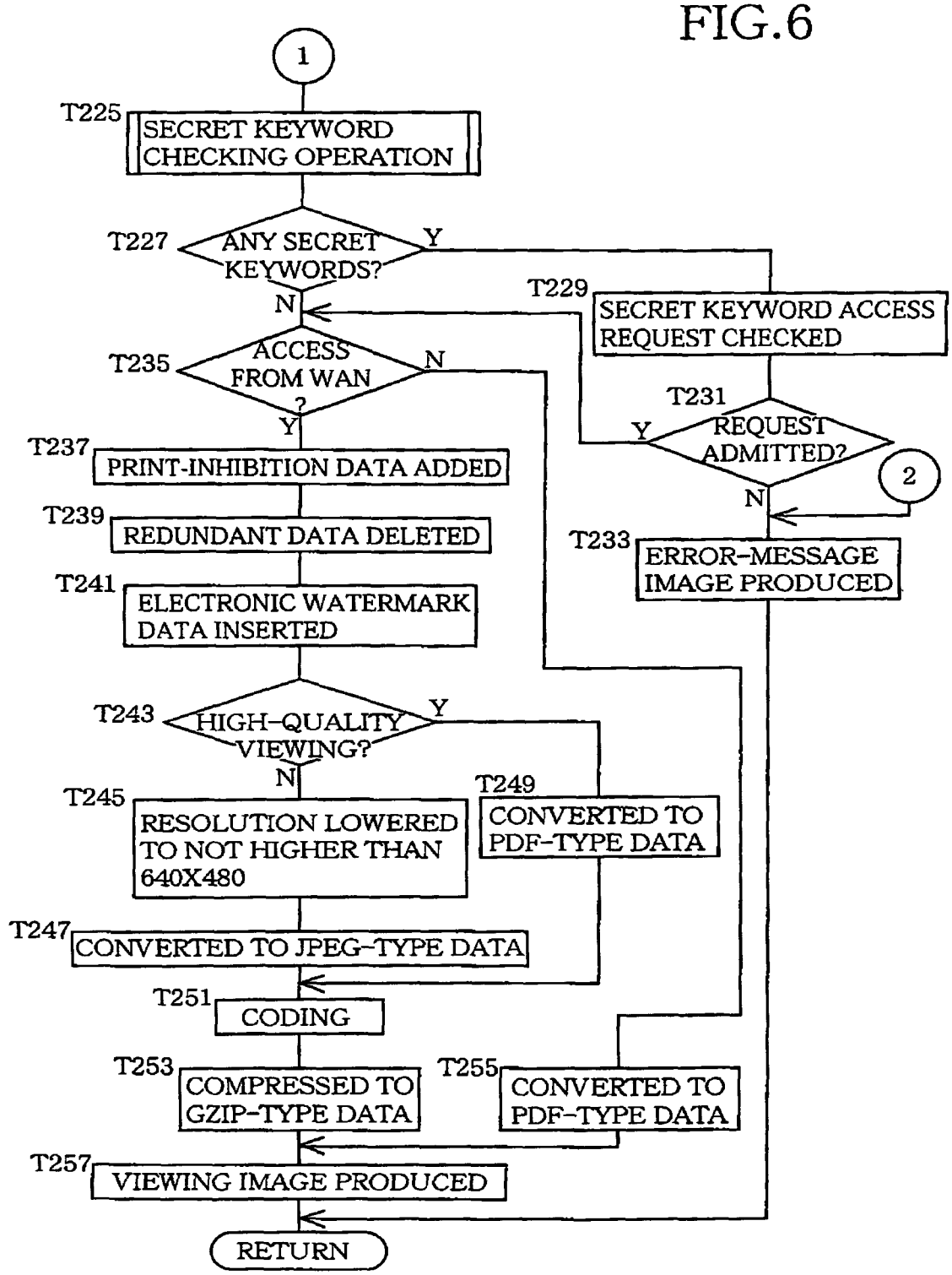
FIG. 6 is a flow chart for explaining a second portion of the viewing-image producing operation.

Next, the viewing image producing operation will be described by reference to flow charts shown in FIGS. 5 and 6. The viewing image producing operation is called and started while the above-described viewing operation is carried out.

The viewing image producing operation is carried out by the control portion 39. First, at Step T203, the control portion 39 reads the requested data out of the data storing portion 31 (more specifically described, out of the content table, the data table, and the keyword table of the portion 31).

Then, at Step T205, the control portion 39 judges, based on the read data, whether the owner of the read data is identical with the user whose log-in request has been allowed (i.e., the user whose name has been inputted in the user's name text box 42 shown in FIG. 8 and who has passed the checking of the log-in request at Step T120). If a positive judgment is made, the control of the control portion 39 proceeds, along connector "1", with Step T225 of the flow chart of FIG. 6; and if not, the control goes to Step T207.

At Step T207, the control portion 39 checks the security attribute of the read data, i.e., checks the information stored by the security attribute field 51f of the content table. If the security attribute of the read data is the fourth degree that data are fully secret, i.e., if a positive judgment is made, the control of the control portion 39 proceeds, along connector "2", with Step T233 of the flow chart of FIG. 6; and if not, the control goes to Step T209.

At Step T209, the control portion 39 checks again the security attribute of the read data, i.e., judges whether the security attribute of the read data is the second degree that data are open within the company only. If a positive judgment is made, the control of the control portion 39 goes to Step T211; and if not, the control goes to Step T213.

At Step T211, the control portion 39 judges whether the sort of the network to which the requesting terminal is connected is WAN (here it is assumed that WAN encompasses VPN). If a positive judgment is made, the control of the control portion 39 goes, along connector "2", to Step T233 of the flow chart of FIG. 6; and if not, the control goes, along connector "1", to Step T225 of FIG. 6.

At Step T213 to which the control goes when a negative judgment is made at Step T209, the control portion 39 checks again the security attribute of the read data, i.e., judges whether the security attribute of the read data is the third degree that data are open to the partner(s) only. If a positive judgment is made, the control of the control portion 39 goes to Step T215; and if not, the control goes, along connector "1", to Step T225 of the flow chart of FIG. 6.

At Step T215, the control portion 39 judges whether the sort of the network to which the requesting terminal is connected is VPN. If a positive judgment is made, the control of the control portion 39 goes to Step T217; and if not, the control goes to Step T219.

At Step T217, the control portion 39 checks a VPN request. Then, the control goes to Step T223. The checking of VPN request may be carried out by additionally requesting the terminal to send a user's name and a password that are exclusive for VPN, or requesting the terminal to send an electronic certificate.

At Step T219 to which the control goes when a negative judgment is made at Step T215, the control portion 39 judges whether the sort of the network to which the requesting terminal is connected is WAN (here it is assumed that WAN does not encompass VPN). If a positive judgment is made, the control of the control portion 39 goes to Step T221; and if not, the control goes, along connector "1", to Step T225 of the flow chart of FIG. 6.

At Step T221, the control portion 39 checks a WAN request. Then, the control goes to Step T223. The checking of WAN request may be carried out by additionally requesting the terminal to send a user's name and a password that are exclusive for WAN, or requesting the terminal to send an electronic certificate.

At Step T223 followed by Step T217 or Step T221, the control portion 39 judges whether the PVN or WAN request has been allowed. If a positive judgment is made, the control of the control portion 39 goes, along connector "1", to Step T225 of the flow chart of FIG. 6; and if not, the control goes, along connector "2", to Step T233 of FIG. 6.

Next, the flow chart of FIG. 6 will be described. Along connector "1", the control of the control portion 39 goes to Step T225, i.e., a secret keyword checking operation in which the control portion 39 inspects the data that have been requested by the user of the terminal and read out of the data storing portion 31, so as to judge whether at least one secret keyword is present in the data in issue. The secret keyword checking operation will be described in detail later.

The following operation of the control portion 39 depends on a result of the checking at Step T225. At Step T227, the control portion 39 judges whether at least one secret keyword has been found in the data in issue. If a positive judgment is made, the control of the control portion 39 goes to Step T229; and if not, the control goes to Step T235.

At Step T229, the control portion 39 checks a secret-keyword access request. Then, the control goes to Step T231. The checking of secret-keyword access request may be carried out by additionally requesting the terminal to send a user's name and a password that are exclusive for this request, or requesting the terminal to send an electronic certificate.

At Step T231, the control portion 39 judges whether the secret-keyword access request has been allowed. If a positive judgment is made, the control of the control portion 39 goes to Step T235; and if not, the control goes to Step T233.

If a negative judgment is made at Step T231, or if the control of the control portion 39 proceeds along connector "2", the control goes to Step T233 where the control portion 39 produces an error-message image including a message representing that the secret-keyword access request has not been allowed. However, no examples of the error-message image are shown. After the error-message image has been produced, the present operation (i.e., the viewing image producing operation) is ended, and the control of the control portion 39 goes back to the calling step in the viewing operation, i.e., Step T155 of FIG. 4.

If a positive judgment is made at Step T231, or if a negative judgment is made at Step T227, the control goes to Step T235 to judge whether the control portion 39 is communicating with the requesting terminal through the WAN communication portion 15. If a positive judgment is made, the control of the control portion 39 goes to Step T237; and if not, that is, if the control portion 39 is communicating with the requesting terminal through the LAN communication portion 13, the control goes to Step T255.

At Step T255, the control portion 39 converts the data in issue into PDF (portable document format) data. Then, the control goes to Step T257.

At Step T237 to which the control goes when a positive judgment is made at Step T235, the control portion 39 adds, to the data in issue, printing inhibiting data. In addition, at Step T239, the control portion 39 deletes redundant data (e.g., blank data or unnecessary attribute data); and at Step T241, the control portion 39 inserts electronic watermark data into the data in issue.

Subsequently, at Step T243, the control portion 39 judges whether the requesting terminal is sending a reading request corresponding to the viewing (high quality) command button 85a, that is, judges whether the user of the terminal has clicked the viewing (high quality) command button 85a or the viewing (high DL speed) command button 85b (see FIG. 9). If a positive judgment is made, the control goes to Step T249; and if not, the control goes to Step T245.

At Step T249, the control portion 39 converts the data in issue into PDF data. Then, the control goes to Step T251.

On the other hand, at Step T245, the control portion 39 converts or reduces the data in issue by lowering a resolution of the data to not higher than 640 dots×480 dots while maintaining an aspect ratio thereof. Subsequently, at Step T247, the control portion 39 converts the reduced data into a JPEG (ISO/IEC 10918-1) type data. Then, the control goes to Step T251.

At Step T251, the control portion 39 subjects the thus converted data to coding. To this end, a coding algorithm such as DES or MD5 is used. Subsequently, at Step T253, the control portion 39 compresses the coded data into a gzip (RFC 1952) type data. Then, the control goes to Step T257.

Figure 10:
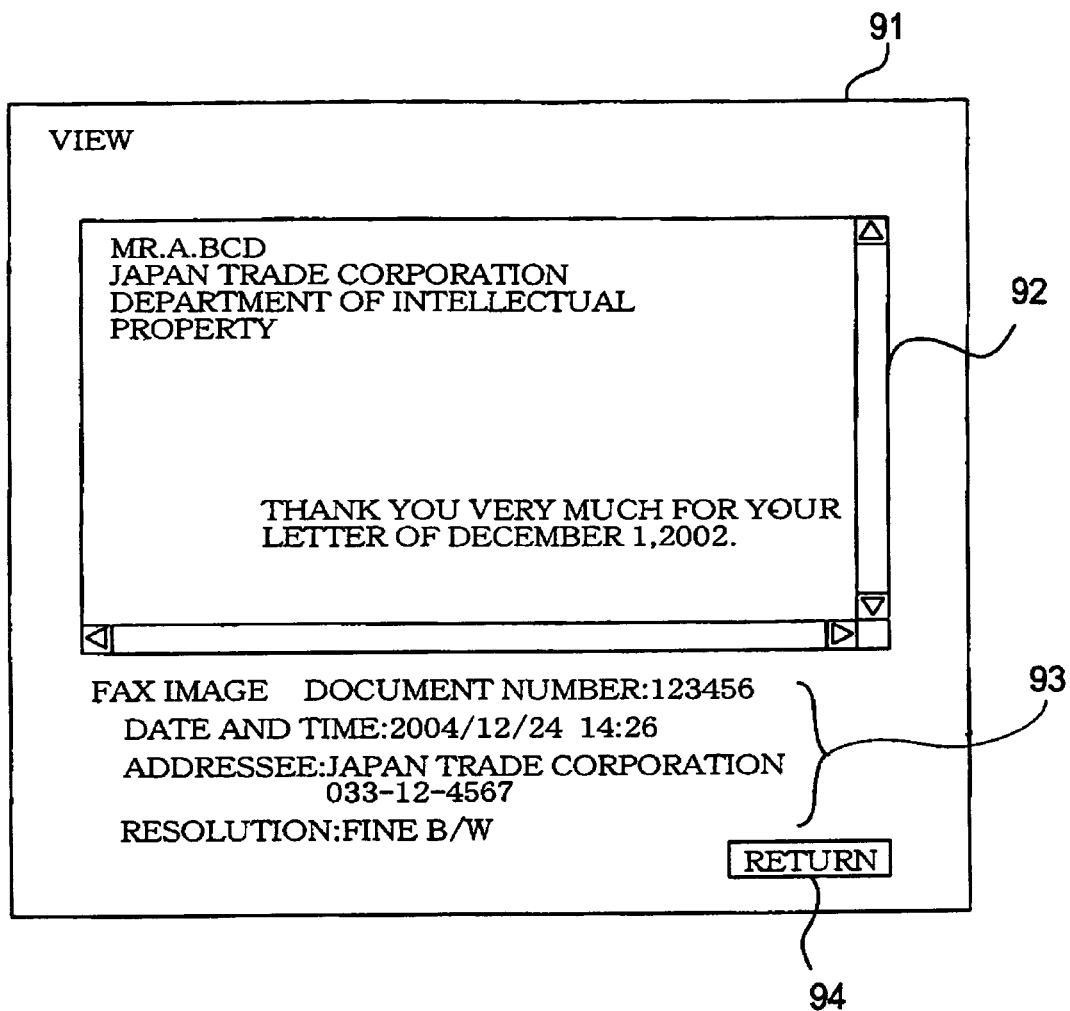
FIG. 10 is an illustrative view for explaining a viewing image that is displayed on the screen of the terminal.

At Step T257, the control portion 39 produces a viewing image that is constituted by the compressed data obtained at Step T253, or the PDF data obtained at Step T255. FIG. 10 shows an example of the viewing image 91 that is displayed on the screen of the terminal. The viewing image 91 includes a data displaying area 92, an attribute displaying area 93, and a return command button 94. The data displaying area 92 is for displaying the data in issue, that is, expanding the compressed data (i.e., image data) of the gzip (RFC 1952) type sent from the multi-function apparatus 11 and displaying the expanded data, or developing and displaying the PDF file sent from the apparatus 11. The attribute displaying area 93 is for display one or more attributes of the data displayed in the data displaying area 92. The return command button 94 is used for returning to the document retrieving image 81. After the viewing image has been produced, the present operation (i.e., the viewing image producing operation) is ended, and the control of the control portion 39 goes back to the calling step in the viewing operation, i.e., Step T155 of FIG. 4.

(3) Secret Keyword Checking Operation

Figure 7:
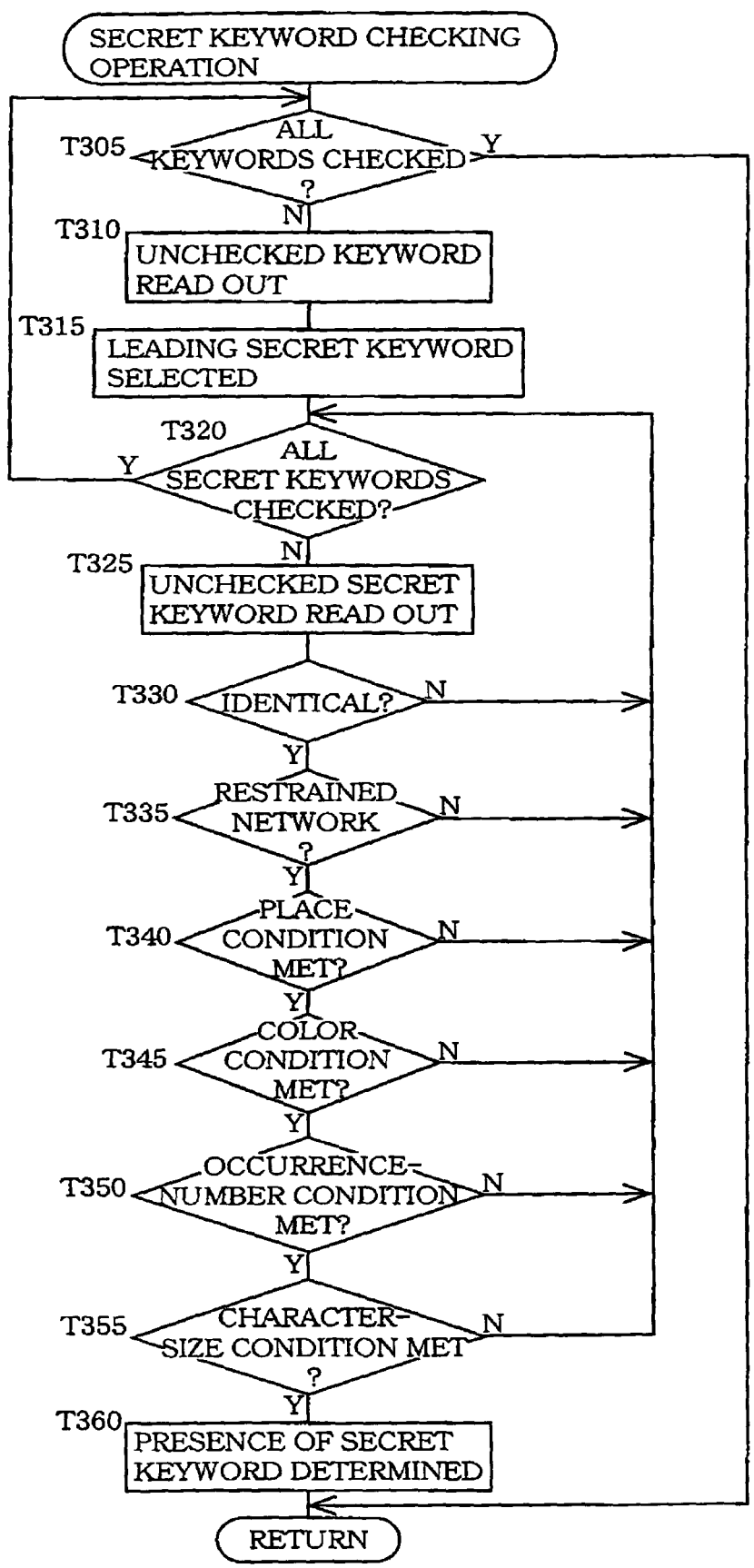
FIG. 7 is a flow chart for explaining a secret keyword checking operation that is carried by the control portion.

Next, the secret keyword checking operation will be described by reference to the flow chart of FIG. 7. The secret keyword checking operation is called and started by the control portion 39 during the above-described viewing-image producing operation.

First, at Step T305, the control portion 39 judges whether all the keywords present in the data in issue (i.e., the keywords stored by the keyword table in association with the data in issue) have been subjected to an operation at Step T310 that will be described below. If a positive judgment is made, then the present operation (i.e., the secret keyword checking operation) is ended, and the control of the control portion 39 goes back to the calling step in the viewing image producing operation, i.e., Step T225 of FIG. 6.

On the other hand, if a negative judgment is made at Step T305, the control of the control portion 39 goes to Step T310 to read, from the keywords stored by the keyword table in association with the data in issue, one of the keywords (i.e., records) that have not been subjected to the operation of Step T310.

Subsequently, at Step T315, the control portion 39 selects a leading one of the secret keywords (i.e., records) stored by the secret keyword table.

Then, at Step T320, the control portion 39 judges whether all the secret keywords stored by the secret keyword table have been subjected to an operation at Step T325 that will be described below. It is, however, noted that each time the control portion 39 selects, at Step T315, a leading one of the secret keywords stored by the secret keyword table, all the secret keywords are initialized to a state before being subjected to the operation of Step T325.

If a positive judgment is made at Step T320, then the control of the control portion 39 goes back to Step T305.

On the other hand, if a negative judgment is made at Step T320, then the control of the control portion 39 goes to Step T325 to read one of the secret keywords (i.e., records) that have not been subjected to the operation of Step T325.

Subsequently, at Step T330, the control portion 39 judges whether the secret keyword read at Step T325 is identical with the keyword read at Step T310. If a positive judgment is made, the control goes to Step T335; and if not, the control goes back to Step T320.

At Step T335, the control portion 39 judges, based on the secret keyword table (FIG. 3), whether the sort of the network to which the requesting terminal is connected is an access-restrained network (indicated by symbol "Y") corresponding to the secret keyword read at Step T325. If a positive judgment is made, the control goes to Step T340; and if not, the control goes back to Step T320.

At Step T340, the control portion 39 judges whether the place where the keyword read at Step T310 occurs satisfies a "place" condition corresponding to the secret keyword read at Step T325. If a positive judgment is made, the control goes to Step T345; and if not, the control goes back to Step T320.

At Step T345, the control portion 39 judges whether a color of characters of the keyword read at Step T310 satisfies a "color" condition corresponding to the secret keyword read at Step T325. If a positive judgment is made, the control goes to Step T350; and if not, the control goes back to Step T320.

At Step T345, the control portion 39 judges whether a number of occurrences of the keyword read at Step T310 satisfies an "occurrence number" condition corresponding to the secret keyword read at Step T326. If a positive judgment is made, the control goes to Step T355; and if not, the control goes back to Step T320.

At Step T355, the control portion 39 judges whether a size of characters of the keyword read at Step T310 satisfies a "character size" condition corresponding to the secret keyword read at Step T325. If a positive judgment is made, the control goes to Step T360; and if not, the control goes back to Step T320.

At Step T360, the control portion 39 makes and stores a judgment that at least one secret keyword has been found in the data in issue. Then, the control of the control portion 39 goes back to the calling step in the viewing image producing operation, i.e., Step T225 of FIG. 6.

Heretofore, the construction and operation of the multi-function apparatus 11 have been described. In short, the control portion 39 of the present apparatus 11 compresses, at Step T239, T245, T247, T249, or T253, the data to be sent out from the communication interface (i.e., the WAN communication portion 15) connected to WAN whose bandwidth may be narrow, to the requesting terminal. Thus, the present apparatus 11 can solve one of proper problems of a specific network, i.e., the problem that if the bandwidth of WAN is narrow, then communication takes a long time. In addition, since the apparatus 11 is configured to do, or not to do, the compression of data, depending upon the sort of the communication interface used, the apparatus 11 need not do any communications to measure a bandwidth, and is free of the problem of overhead caused by those communications. Thus, the present invention can be applied to a large-scale communication system.

In addition, the present apparatus 11 protects, at Step T237, T241, or T251, the data to be sent out from the communication interface (i.e., the WAN communication portion 16), to the requesting terminal, via the communication line whose security level may be low. Thus, the present apparatus 11 can solve one of proper problems of a specific network, i.e., the problem that data may be stolen or modified on the communication line of WAN. For example, the present apparatus 11 adds, at Step S237, the printing-inhibition data to the data to be sent to the user of the requesting terminal. Thus, the present apparatus 11 can protect the rights of the person who provides the data. Consequently the present apparatus 11 can provide various sorts of data to many users.

Hereinafter, other embodiments of the present invention are described.

The above-described multi-function apparatus 11 is configured such that when a user of a terminal views a document stored by the apparatus 11, the user can select, on the display of the terminal, the high DL speed (i.e., the data are converted to JPEG type data whose resolution is low) or the high resolution (i.e., the data are converted to the PDF file). Additionally, the apparatus 11 may be configured such that a user of a terminal can select, on the terminal, a compression rate (i.e., a degree of compression), whether to compress data or not, and/or whether to code data or not. In this case, users of terminals can more easily and effectively utilize the apparatus 11. Otherwise, the apparatus 11 may be configured such that a user of the apparatus 11 can select, through the operable portion 35, a compression rate, whether to compress data or not, and/or whether to code data or not.

In the first embodiment shown in FIGS. 1 through 10, the compressing portion 39 can compress information such that the compressed information is reversible. Therefore, the first sort of communication interface 15 can transmit the information in a reduced size (i.e., a reduced file size), on one hand, and a terminal that receives the compressed information can reverse the received, compressed information to the complete, original information, on the other hand.

The compressing portion 39 can reversibly compress information according to a reversible compression algorithm, e.g., a gzip (RFC 1952). It is convenient to use the gzip (RFC 1952) since it is an algorithm assuring that a WEB server can easily compress a file and a browser can easily expand the compressed file to its original form.

However, the compressing portion 39 can also compress information such that the compressed information is irreversible. Generally, information that is irreversibly compressed can be more largely reduced in size (i.e., file size) than information that is reversibly compressed.

The compressing portion 39 can irreversibly compress information by deleting one or more redundant portions of the information. The redundant portions may be meaningless information such as "0" or attribute information.

Alternatively, in the case where information comprises image information, the compressing portion 39 can irreversibly compress the image information according to an irreversible compression algorithm comprising a JPEG (ISO/IEC 10918-1). Since the JPEG employs an algorithm that can compress information at a high rate by utilizing visual characteristics of a human being, it can effectively compress image information.

In the case where information comprises image information having a first degree of resolution, the compressing portion 39 can irreversibly compress the image information by converting the image information such that the first degree of resolution thereof is changed to a second degree of resolution lower than the first degree of resolution. Since the compressing portion 39 reduces a size of an image represented by the image information, the size (i.e., file size) of the information to be transmitted is effectively reduced. Two or all of the above-described techniques (the deletion of redundant information, the use of JPEG, and the lowering of resolution degree of image) may be combined with each other.

Though a compression rate (or degree) at which the compression portion 39 compresses information may be fixed at a pre-selected rate, the information server 11 may be configured such that the compression rate can be changed by a user of a terminal. To this end, the information server 11 further comprises a compression-degree receiving portion 15 which receives, from a terminal via the first sort of communication interface 15, a compression-degree signal representing a requested compression degree, and the compressing portion 39 compresses information according to the requested compression degree represented by the received compression-degree signal.

Since the compression degree can be designated from the side of a terminal, the information server 11 can be more conveniently used by a user of the terminal. For example, in the case where the information server 11 is connected to the Internet, terminals may be connected to the Internet via various sorts of communication infrastructure (e.g., wireless communication or telephone network). Therefore, depending upon the circumstances, users of some terminals may desire to increase the compression degree and thereby increase a communication speed, and users of other terminals may desire to obtain information by decreasing the compression degree in spite of the increase of communication time.

Whether to compress information or not may be designated from the side of a terminal. To this end, the information server 11 further comprises a compression-stop-command receiving portion 15 which receives, from a terminal via the first sort of communication interface 15, a compression-stop command to temporarily stop the compression of the information, and the compressing portion 39 temporarily stops, according to the received compression-stop command, the compression of the information, so that the first sort of communication interface 15 transmits the information as it is, to the terminal via the first network, i.e., the wide-area network or the Internet.

In this case, too, the information server 11 can be more conveniently used by a user of the terminal.

In the first embodiment, the protecting portion 39 can protect information by coding the information. There are known various coding algorithms, and some of them considerably easily code information and highly protect the same. Thus, if one of those coding algorithms is used, the problem that information may be stolen or modified while being transmitted through a specific sort of communication network, can be solved.

In addition, the protecting portion 39 can protect the information by inhibiting an image represented by the information from being printed. For example, a PDF-type document file can be prepared such that the file is inhibited from being printed and, if, in fact, the file is so prepared to be inhibited from being printed, then a terminal that receives the file cannot print it. Thus, the rights of the person who provides the information can be easily protected.

Though the information server 11 can be configured such that whether to protect information or not is selected depending upon the sort of the communication interface used, the information server 11 may also be configured such that whether to protect information or not may be selected by a user of a terminal. To this end, the information server 11 further comprises a protection-stop-command receiving portion 15 which receives, from a terminal via the first sort of communication interface 15, a protection-stop command to temporarily stop the protection of the information, and the protecting portion 39 temporarily stops, according to the received protection-stop command, the protection of the information, so that the first sort of communication interface 15 transmits the information as it is, to the terminal via the first network, i.e., the wide-area network.

Since whether to protect information or not can be selected from the side of a terminal, the information server 11 can be more conveniently used by a user of the terminal. For example, depending upon the circumstances, users of some terminals may desire not to decode coded information at their sides, even though the security of the information on the network may be sacrificed to some degree.

In the first embodiment, the information server 11 employs both the compressing portion 39 and the protecting portion 39. In this case, too, the protecting portion 39 may protect information by coding the information or inhibiting the printing of the information, and the protecting portion 39 may be configured such that whether to protect information or not can be selected by a user of a terminal.

The information server 11 further comprises the router portion 39 which has a routing function, i.e., routes information between the communication interfaces 13, 15.

In addition, the information server 11 comprises the printer portion 27 which prints, on a printing medium, an image represented by at least one of the information stored by the storing portion 31 and information received by the communication portion 13, 15.

In addition, the information server 11 comprises the scanner portion 29 which reads an image printed on a printing medium and carries out at least one of (a) a first operation to cause the storing portion 31 to store information representing the read image and (b) a second operation to cause the communicating portion 13, 15 to transmit information representing the read image.

In addition, the information server 11 comprises the facsimile portion 17, 19, 21 which transmits, via a telephone line, at least one of (a) the information stored by the storing portion 31 and (b) information received by the communication portion 13, 15, to at least one terminal connected to the telephone line.

Since the information server 11 employs at least one of the above-indicated various functions, the server 11 can be used by more terminals and more frequently, while the above-described advantages are obtained.

Hereinafter, a second embodiment of the present invention will be described by reference to the drawings. The second embodiment relates to a multi-function apparatus (MFA) 120 functioning as a communication apparatus in accordance with the present invention.

Figure 11:
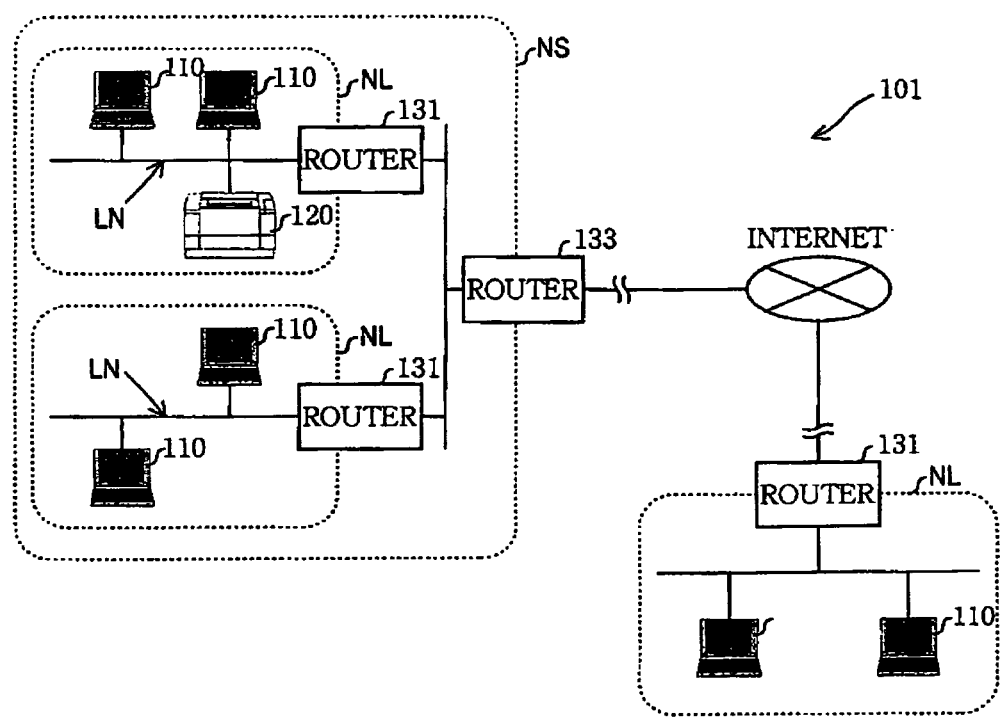
FIG. 11 is an illustrative view of a construction of a communication system including a multi-function apparatus (MFA) as a second embodiment of the present invention.
Figure 12A:
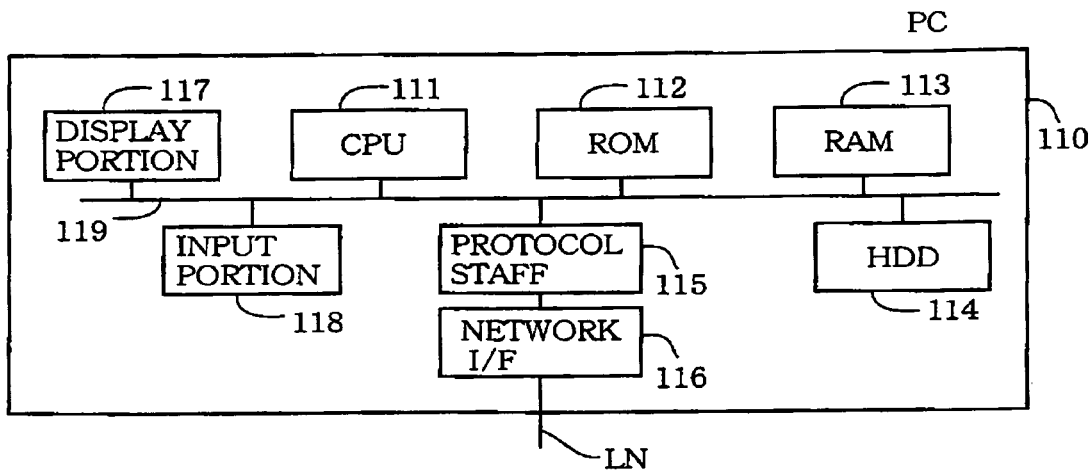
FIG. 12A is a diagrammatic view of a construction of a PC (personal computer) connected to the communication system.
Figure 12B:
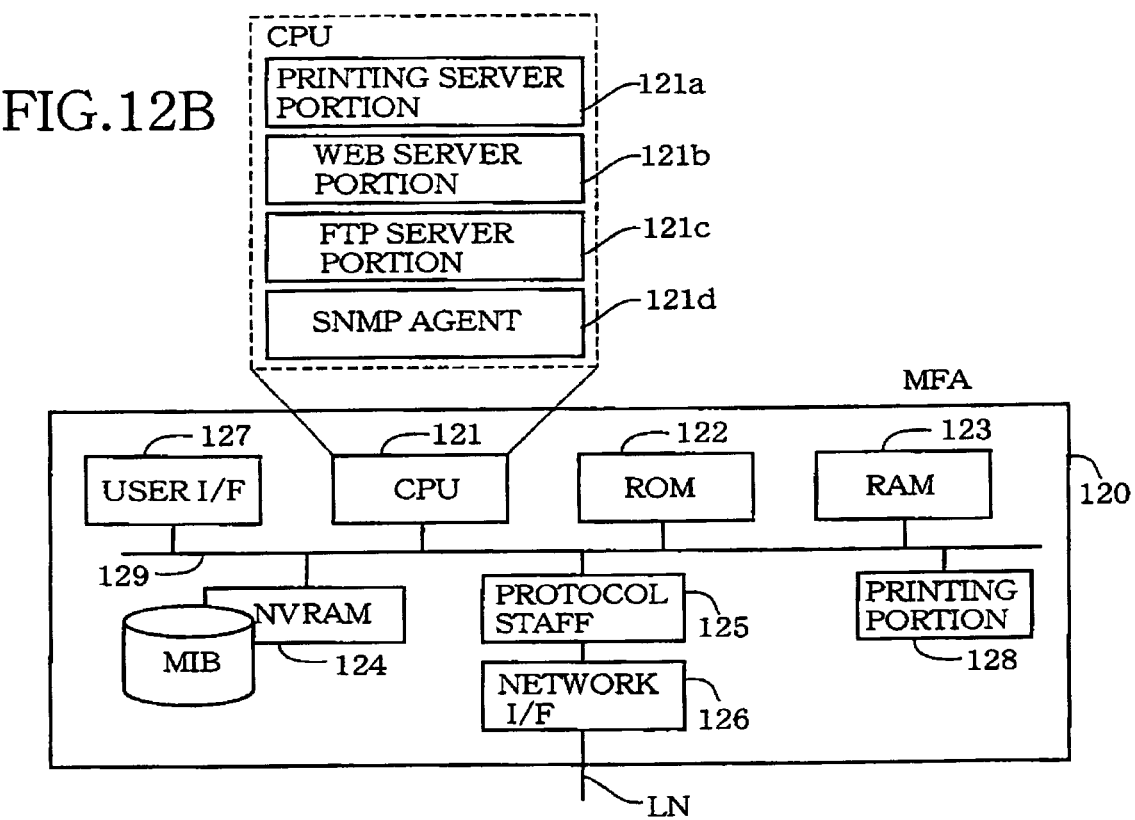
FIG. 12B is a diagrammatic view of a construction of the multi-function apparatus.

FIG. 11 is an illustrative view for explaining a construction of a communication system 101 that operates according to an internet protocol (IP) and includes, as main constituents thereof, personal computers (hereinafter, abbreviated to the "PCs") 110, the multi-function apparatus 120, and routers 131, 133 that relay data between networks constituting (or belonging to) the Internet. FIG. 12A is a diagrammatic view of a construction of each PC 110; and FIG. 12B is a diagrammatic view of a construction of the multi-function apparatus 120.

Each of the PCs 110 includes a CPU (central processing unit) 111 that carries out various sorts calculations; a ROM (read only memory) 112 that stores, e.g., control programs; a RAM random access memory) 113 that has a temporary-storage function; a hard disc drive (HDD) 114 that stores, e.g., an operating system; a protocol staff 115 that is for controlling communications; a network interface (I/F) 116 to which a communication cable LN is connected; a display portion 117 that includes, e.g., a liquid crystal display; an input portion 118 (e.g., a keyboard and/or a pointing device) that is operable by a user; and a bus 119 that is for connecting those elements 111 through 118 to each other.

The protocol staff 115 conceptually indicates that the network interface 116 carries out data communications under control of the protocol staff 115. In act, the protocol staff 115 is constituted by a program module that is employed by the PC 110 (i.e., stored by the hard disc drive 114) so as to carry out data communications according to IPv6 (internet protocol version 6). In a state in which the CPU 111 implements the program module, the PC 110 functions as a communication apparatus that can communicate according to IPv6. However, the protocol staff 115 may be constituted by a different program module to carry out data communications according to, e.g., IPv4 (internet protocol version 4).

The hard disc drive 114 stores a manager program that enables the PC 110 to function as an SNMP (simple network management protocol) manager. In a state in which the CPU 111 implements the manager program, the PC 110 functions as the SNMP manager.

The multi-function apparatus 120 includes a CPU 121 that carries out various sorts calculations; a ROM 122 that stores, e.g., control programs; a RAM 123 that has a temporary-storage function; an NVRAM (non-volatile RAM) 124; a protocol staff 125 that is for controlling communications; a network interface (I/F) 126 to which a communication cable LN is connected; a user interface (I/F) 127; a printer portion 128 that can record an image on a recording sheet; and a bus 129 that is for connecting those elements 121 through 128 to each other.

The ROM 122 (or the NVRAM 124) of the multi-function apparatus 120 stores a control program for receiving, according to Ipr (line printer daemon protocol), printing data from each PC 110 in the networks and controlling the printer portion 128 to record or print an image according to the received printing data. In a state in which the CPU 121 implements the program, the CPU 121 functions as a printing server portion 121a.

In addition, the ROM 122 (or the NVRAM 124) of the multi-function apparatus 120 stores a control program for enabling the CPU 121 to function as a web server (i.e., an extensible web server: EWS). In a state in which the CPU 121 implements the program, the CPU 121 functions as a web server portion 121b. Moreover, the ROM 122 (or the NVRAM 124) of the multi-function apparatus 120 stores a control program for enabling the CPU 121 to function as an FTP (file transfer protocol) server. In a state in which the CPU 121 implements the program, the CPU 121 functions as an FTP server portion 121c.

The NVRAM 124 stores a data base (i.e., a management information base: MIB) that registers set information related to the multi-function apparatus 120; and an agent program for enabling the CPU 121 to carry out, according to SNMP, the sending or updating of information registered by the data base, based on a command from a PC 110 functioning as an SNMP manager. In a state in which the CPU 121 implements the agent program, the multi-function apparatus 120 functions as an SNMP agent 121d.

Like the protocol staff 115 of each PC 110, the protocol staff 125 of the multi-function apparatus 120 is constituted by a program module that is employed by the apparatus 120 to carry out data communications according to IPv6. In a state in which the CPU 121 implements the program module, the multi-function apparatus 120 functions as a communication apparatus that can communicate according to IPv6.

In order that the PCs 110 and the multi-function apparatus 120 can communicate data with each other, an IP address as identification (ID) information that identifies each of the PCs 110 and the apparatus 120 from the others is allotted to the each of the PCs 110 and the apparatus 120. In the present embodiment, it is assumed that the PCs 110 and the multi-function apparatus 120 are nodes constituting the networks that operate according to IPv6, and that a plurality of sorts of IP addresses that have different scopes are allotted to each of those nodes.

More specifically described, in the present embodiment, a global IP address (hereinafter, referred to as the "global address") that is effective throughout the Internet, and a local IP address (hereinafter, referred to as the "local address") that is effective in a related local-area network only are allotted to each of the nodes. In addition, according to IPv6, a plurality of sorts of local IP addresses are allotted. That is, a link local address and a site local address as those local IP addresses are allotted to each of the nodes.

Figures 13A, 13B:
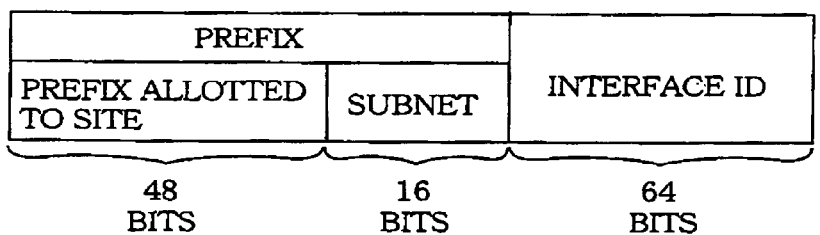
FIG. 13A is an illustrative view of a constitution of an IP address.
FIG. 13B is an illustrative view of respective constitutions of respective prefixes of different sorts of IP addresses.

FIG. 13A illustrates a constitution of an IP address; and FIG. 13B illustrates respective constitutions of respective prefixes of a link local address, a site local address, and a global address.

An IP address in accordance with IPv6 is constituted by a prefix (the most significant 64 bits) as network identification (ID) information, and an interface ID (the least significant 64 bits) as an address portion, and the IP address can be identified as one of a link local address, a site local address, and a global address, based on the prefix thereof.

When nodes communicate with each other, an IP address is added as addresser ID information or addressee ID information to a communication signal (i.e., a packet signal). More specifically described, when each of the protocol stab 115 and the protocol staff 125 transmits a communication signal to a node as an addressee, the each protocol staff 115, 125 as an addresser adds, to the communication signal, an IP address (i.e., one of a link local address, a site local address, and a global address) of the corresponding PC 110 or the multi-function apparatus 120 as addresser ID information, and an IP address (i.e., one of a link local address, a site local address, and a global address) of the node as addressee ID information. Thus, a communication in accordance with IPv6 is carried out. However, it is noted that according to IPv6, different sorts of IP addresses have different scopes, as described below:

A link local address is an IP address whose prefix is described as a fixed value indicating a link local address. More specifically described, the prefix is described as the value of "fe80::/64". A packet signal including a link local address is not allowed to pass through any of the routers 131, 133. That is, a communication using a link local address can occur in only a network (i.e., a link) constituted by nodes having respective link local addresses located under a lowermost router 131.

Hereinafter, the above-indicated network will be referred to as the "link local". The link locals are indicated at NL in FIG. 11. In the communication system 1, the link locals NL are the smallest networks.

A site local address is an IP address whose prefix is constituted by a fixed value indicating a site local address (the most significant 48 bits: "fec0::/48"), and a site level aggregation identification (SLA ID) (the least significant 16 bits). A packet signal including a site local address is allowed to pass through any of the routers 131 in only a limited area, i.e., a site as the larger area in a local-area network.

Thus, a network constituted by communication apparatuses having respective site local addresses functions as a wider local-area network than a link local NL. Hereinafter, the wider network will be referred to as the "site local". The site local is indicated at NS in FIG. 11. The site local NS is a network whose level is lower than an internet service provider (ISP).

A global address is an IP address whose prefix includes a value of "001" as the most significant 3 bits thereof. A global address is uniquely or univocally allotted to each of the nodes constituting the Internet, and a prefix of a global address is uniquely allotted to each of the networks each of which is constituted by nodes constituting a link local NL functioning as the lowest-level network in the Internet.

More specifically described, the most significant 48 bits of a prefix of a global address is uniquely allotted to each of the site locals NS, and the least significant 16 bits of the prefix (i.e., a site level aggregation identification) is uniquely allotted to each of low-layer networks (i.e., sub-networks) constituting each site local NS, i.e., each of link locals NL constituting each site local NS. Like the site level aggregation identification of the prefix of a global address, the site level aggregation identification of the prefix of a site local address is uniquely allotted to each of link locals NL constituting a site local NS.

A packet signal including a global address is allowed to pass through any of the routers 131, 133. Therefore, unlike a packet signal including a link local address or a site local address, a packet signal including a global address is freely sent to any node in the Internet.

A global address, a site local address, a link local address have the above-described definitions in accordance with IPv6. Thus, between nodes constituting a single link local NL, a communication can be carried out using either a global address or a local address (i.e., a link local address or a site local address).

FIG. 14A is a table showing a relationship between sorts of addresses that can be used as an addresser ID, i.e., an addresser address when a communication is carried out between nodes constituting a same link local NL, and sorts of addresses that can be used as an addressee ID, i.e., an addressee address at the same time.

As described above, the communication system 101 has the Internet as the largest network, and the local-area networks functioning as the low-level networks constituting the Internet, and each of the local-area networks has the site local NS and the link locals NL each of which is constituted by the nodes as a portion of the site local NS. Thus, in terms of an area in which communications can be carried out, the communication system 101 has a three-level hierarchical structure including the Internet as the widest-area or highest-level network, the site local NS as the intermediate-area or intermediate-level network, and the link local NL as the narrowest-area or lowest-level network.

Therefore, when a communication is carried out in a link local NL constituted by a portion of the nodes constituting the Internet or a site local NS, not only a link local address but also a site local address or a global address can be used.

Thus, when a communication is carried out between nodes in a same link local NL, the protocol staff 115 or the protocol staff 125 adds, to a communication signal (a packet signal), any one of a link local address, a site local address, and a global address as each of an addresser address and an addressee address, and sends out the packet signal to the link local NL.

FIG. 14B is a table showing a relationship between sorts of addresses that can be used as an addresser address when a communication is carried out between nodes that belong to different link locals LN, respectively, and constitute a same site local NS, and sorts of addresses that can be used as an addressee address at the same time. Thus, when a communication is carried out between nodes that belong to different link locals LN, respectively, and constitute a same site local NS, the protocol staff 115 or the protocol staff 125 adds, to a communication signal (a packet signal), either one of a site local address and a global address as each of an addresser address and an addressee address, and sends out the packet signal to the site local NS.

FIG. 14C is a table showing a relationship between sorts of addresses that can be used as an addresser address when a communication is carried out between two nodes inside and outside a local-area network (i.e., a site local NS), and sorts of addresses that can be used as an addressee address at the same time. Thus, when a communication is carried out between nodes that constitute the Internet and are located inside and outside a site local NS, the protocol staff 115 or the protocol staff 125 adds, to a communication signal (a packet signal), a global address as each of an addresser address and an addressee address, and sends out the packet signal to the Internet.

Unlike IPv4, IPv6 enables the protocol staff 115 or the protocol staff 125 to determine automatically IP addresses (a link local address, a site local address, and a global address), without waiting the user manual setting thereof, automatically set the determined IP addresses for the corresponding PC 110 itself or the multi-function apparatus 120 itself, and thereby automatically connect the corresponding PC 110 or the multi-function apparatus 120 to the corresponding link local-area network NL, the corresponding site local-area network NS, or the Internet as the wide-area network. This operation will be described below.

Figure 15A:
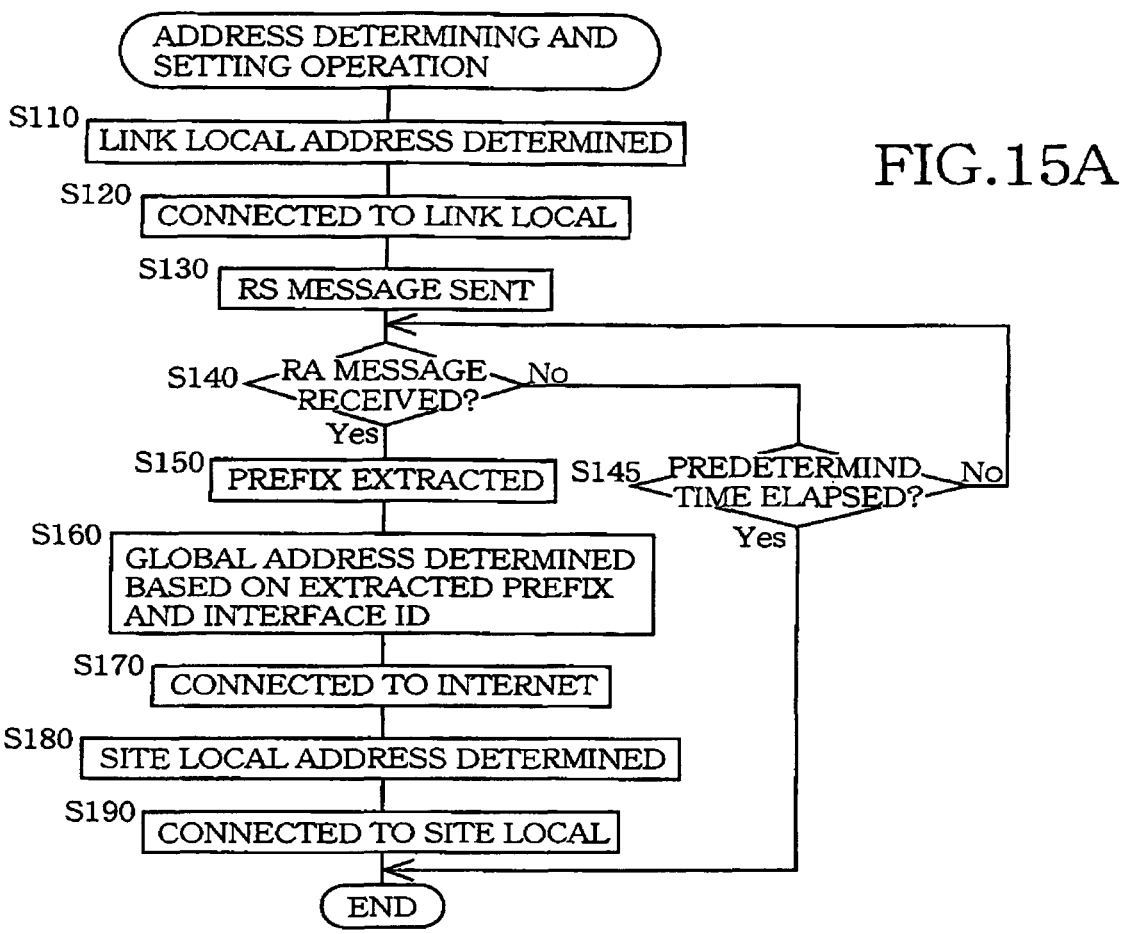
FIG. 15A is a flow chart representing an IP-address determining and setting operation.
Figure 15B:
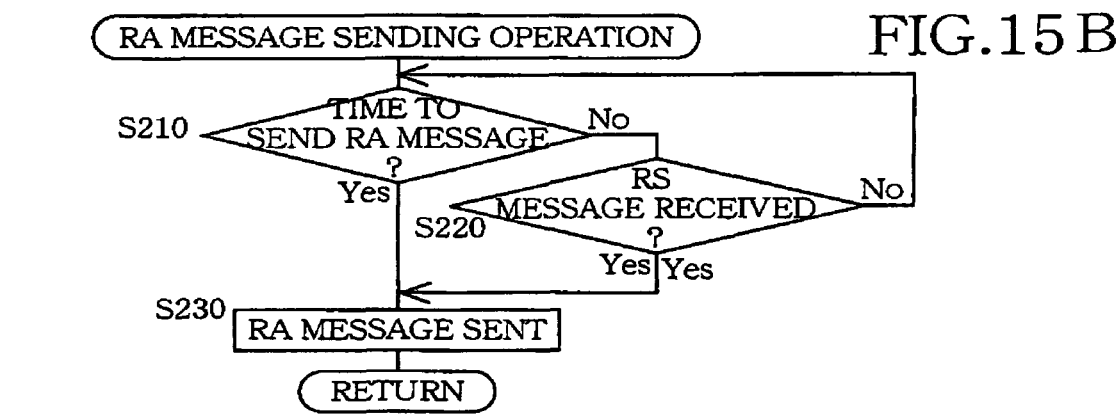
FIG. 15B is a flow chart representing an RA sending operation.

FIGS. 15A and 15B relate to the automatic setting of IP addresses. More specifically described, FIG. 15A shows a flow chart representing an address determining and setting operation that is carried out by the protocol staff 115 of each of the PCs 110 or the protocol staff 125 of the multi-function apparatus 120; and FIG. 15B shows a flow chart representing a RA (router advertisement) sending operation that is repetitively carried out by each of the routers 31.

When the address determining and setting operation is started by the protocol staff 115 (or the protocol staff 125), first, at Step S110, the corresponding PC 110 (or the multi-function apparatus 120) produces or determines an interface ID, based on a MAC (media access control) address allotted to the network interface 116 (or the network interface 126) of the PC 110 itself (or the apparatus 120 itself), and produces or determines a link local address for the PC 110 (or the apparatus 120), by adding a prefix for a link local address, to the determined interface ID. The interface ID is determined such that the ID is not doubled in a same link local NL.

Then, at Step S120, the PC 110 (or the multi-function apparatus 120) sets the determined link local address for the PC 110 itself (or the apparatus 120 itself), and thereby connects the PC 110 (or the apparatus 120) to the corresponding link local NL.

Step S120 is allowed by Step S130 to produce an RS (router solicitation) message to obtain, from the corresponding router 31, an RA message describing a prefix allotted to a lower-level network in the Internet, i.e., the link local NL to which the PC 110 (or the multi-function apparatus 120) belongs, and sends out the produced RS message via the network interface 116 (or the network interface 126) to the link local NL. This RS message is received by the corresponding router 31 which connects the link local NL to the outside.

Then, at Step S140, the PC 110 (or the multi-function apparatus 120) judges whether the PC 110 (or the apparatus 120) has received the RA message from the corresponding router 31. If a negative judgment is made at Step S140, then the PC 110 (or the apparatus 120) judges, at Step S145, whether a predetermined time has elapsed since the RS message was sent out. If a negative judgment is made at Step S145, then the PC 110 (or the apparatus 120) goes back to Step S140. Meanwhile, if a positive judgment is made at Step S145, then the PC 110 (or the apparatus 120) ends the address determining and setting operation.

On the other hand, if a positive judgment is made at Step S140, then the PC 110 (or the multi-function apparatus 120) proceeds with Step S150 to extract, from the received RA message, the prefix identifying the corresponding lower-level network in the Internet, i.e., the corresponding link local NL to which the PC 110 (or the apparatus 120) belongs. Then, at Step S160, the PC 110 (or the apparatus 120) adds the interface ID to the thus extracted prefix, and thereby produces or determines a global address for the PC 110 itself (or the apparatus 120 itself).

Step S160 is followed by Step S170 to set the thus determined global address for the PC 110 (or the multi-function apparatus 120) and thereby connect the PC 110 (or the apparatus 120) to the Internet.

In addition, at Step S180, the PC 110 (or the multi-function apparatus 120) determines, based on the RA message, a prefix for a site local address, and produces or determines a site local address by adding the interface ID to the thus determined prefix. Then, at Step S190, the PC 110 (or the apparatus 120) sets the thus determined site local address fir the PC 110 (or the apparatus 120) and thereby connects the PC 110 (or the apparatus 120) to the corresponding site local NS. Then, the PC 110 (or the apparatus 120) ends the address determining and setting operation.

A network manager gives, in advance, each of the routers 131 a prefix for a global address, i.e., a prefix identifying a low-level network (i.e., a link local NL) located under the each router 131. The each router 131 carries out the RA sending operation in which the above prefix is described in an RA message and this RA message is sent to a requesting node in the low-level network.

More specifically described, in the RA sending operation, first, at Step S210, the router 131 judges whether it is a time to send an RA message. If a positive judgment is made at Step S210, the router 131 sends, at Step S230, an RA message describing a prefix of a global address allotted to the router 131 itself, to a requesting node in the corresponding link local NL. Then, the router 131 ends the RA sending operation.

On the other hand, if a negative judgment is made at Step S210, the router 131 judges, at Step S220, whether the router 131 has received an RS message. If a negative judgment is made at Step S220, the router 131 goes back to Step S210. Meanwhile, if a positive judgment is made at Step S220, the router 131 goes to Step S230 to send the above-described RA message to a requesting node that has sent the above RA message. Then, the router 131 ends the RA sending operation. This operation is periodically carried out to send the RA message.

Heretofore, the general construction of the present communication system 101 has been described. Hereinafter, characteristic operations of the present system 101 will be described.

The multi-function apparatus 120 to which the present invention is applied has a restraining function of restraining an access thereto (i.e., a communication therewith) of a node located outside a local-area network to which the apparatus 120 belongs. In a state in which the restraining function is in use, the apparatus 120 operates in a first mode (Mode 1) or a second mode (Mode 2) so as to restrain an access thereto of a node located outside the local-area network.

Figure 16A:
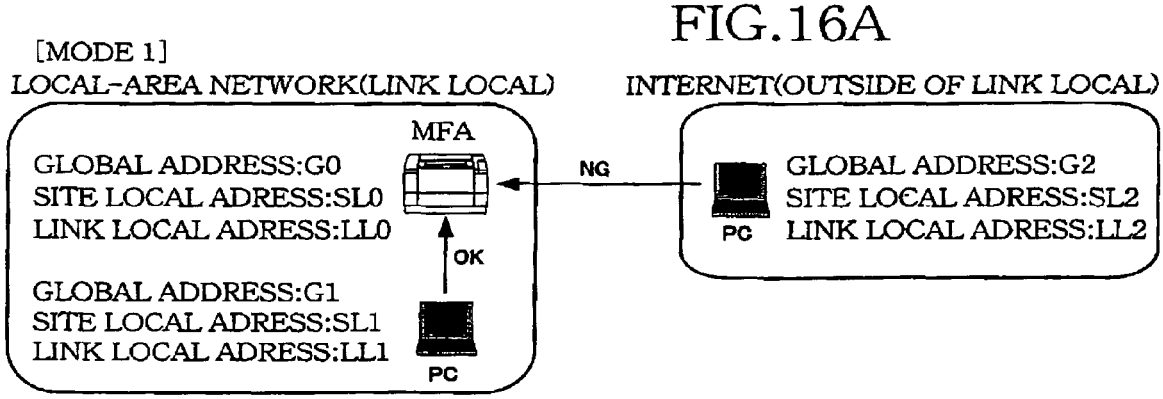
FIG. 16A is an illustrative view for explaining a manner of operation of the multi-function apparatus in Mode 1.

In the state in which the multi-function apparatus 120 operates in Mode 1, the apparatus 120 allows only an access or accesses thereto of a node or nodes located inside a link local NL to which the apparatus 120 belongs, and restrains accesses thereto of the other nodes, i.e., nodes located outside the link local NL to which the apparatus 120 belongs. FIG. 16A illustrates a manner in which the apparatus 120 operates in Mode 1.

Figure 16B:
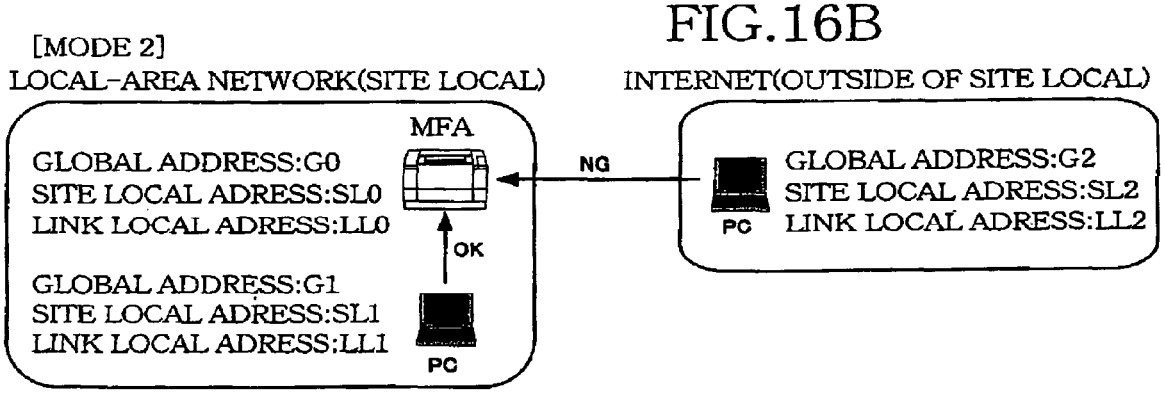
FIG. 16B is an illustrative view for explaining a manner of operation of the multi-function apparatus in Mode 2.
Figure 17:
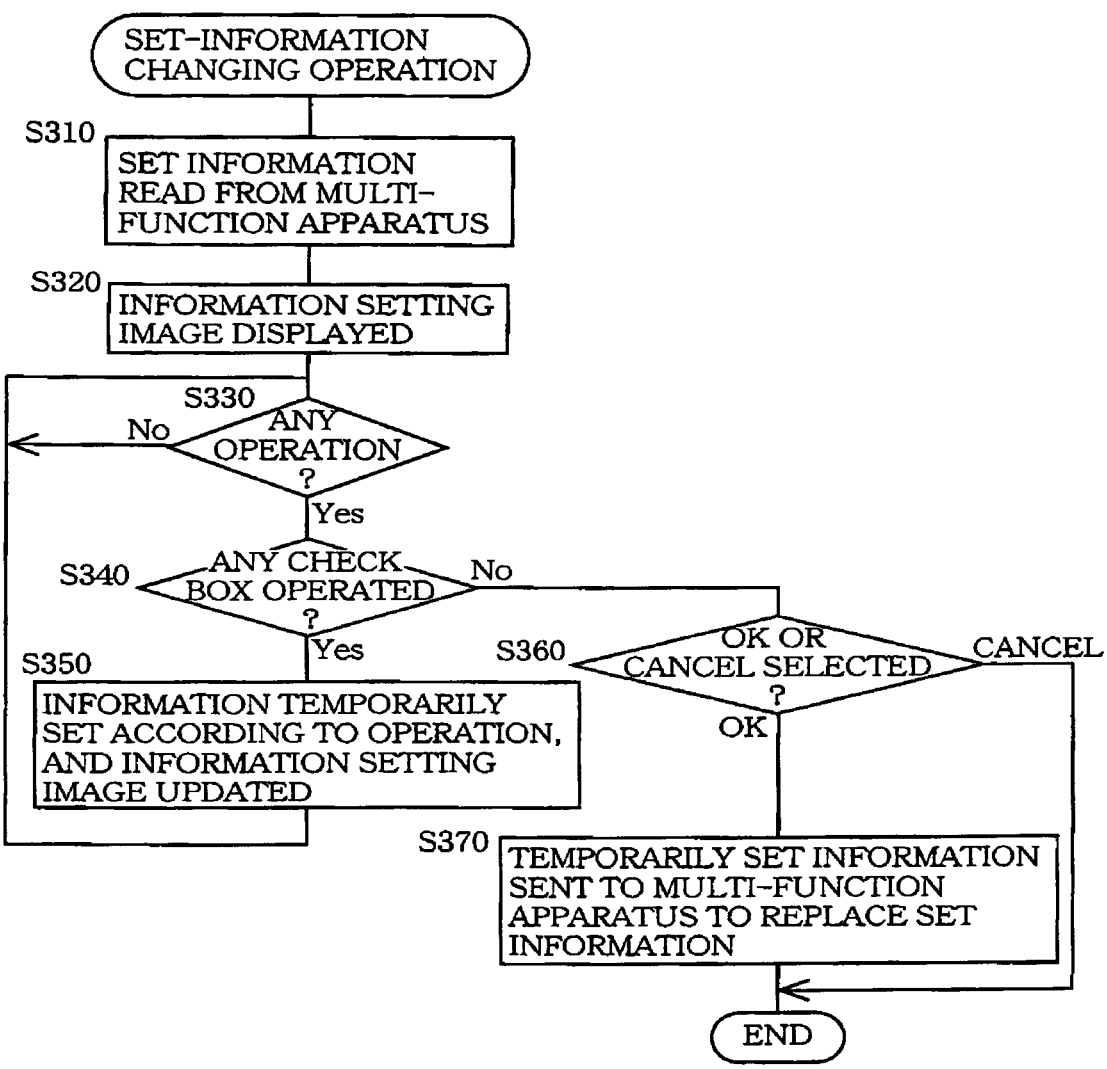
FIG. 17 is a flow chart representing a set-information changing operation that is carried out by a CPU of a PC that functions as an SNMP manager.

In the state in which the multi-function apparatus 120 operates in Mode 2, the apparatus 120 allows only accesses thereto of nodes located inside a site local NS to which the apparatus 120 belongs, and restrains accesses thereto of the other nodes, i.e., nodes located outside the site local NS to which the apparatus 120 belongs. FIG. 16B illustrates a manner in which the apparatus 120 operates in Mode 2.

The present communication system 101 is configured such that the switching of modes, and the enabling or disabling of the restraining function, of the multi-function apparatus 120 can be carried out by only a special PC 10 that can function as an SNMP manager. The CPU 111 of the special PC 110 implements a set-information changing operation, represented by a flow chart shown in FIG. 7, in which the PC 10 changes, according to SNMP, information set for the apparatus 120.

More specifically described, when the set-data changing operation is started by the CPU 111, first, at Step S310, the CPU 111 gains access to the multi-function apparatus 120 and obtains, from the MIB of the apparatus 120, first set information and second set information that are shown in FIGS. 18A and 18B, respectively. FIG. 18A illustrates a constitution of the first set information stored by the NVRAM 124 of the apparatus 120; and FIG. 18B illustrates a constitution of the second set information stored by the NVRAM 124.

As shown in FIG. 18A, the first set information is constituted by a set value or information indicating that the restraining function with respect to accesses with global addresses is enabled or disabled, and a set value or information indicating that the restraining function with respect to accesses with site local addresses is enabled or disabled; and as shown in FIG. 18B, the second set information is constituted by a set value or information indicating that a restraining function with respect to accesses to the printing server portion 121a is enabled or disabled, a set value or information indicating that a restraining function with respect to accesses to the web server portion 121b is enabled or disabled, and a set value or information indicating that a restraining function with respect to accesses to the FTP server portion 121c is enabled or disabled.

Figure 19:
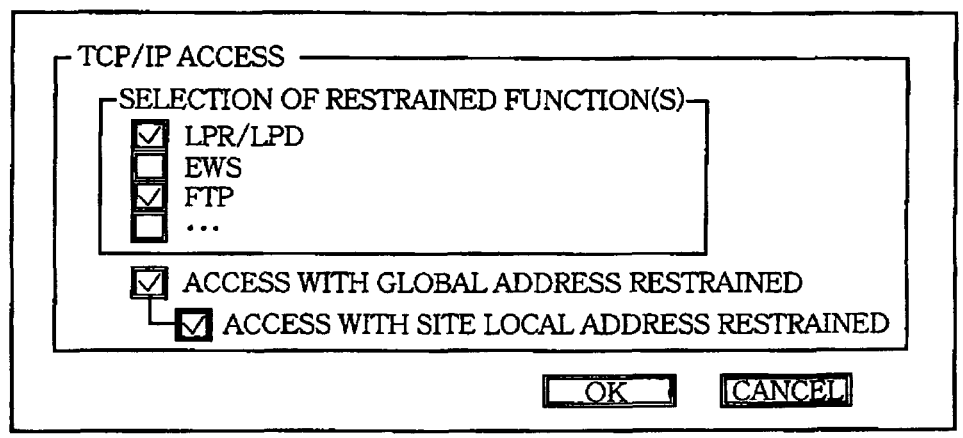
FIG. 19 is an illustrative view for explaining a constitution of an information setting image.
Figure 20:
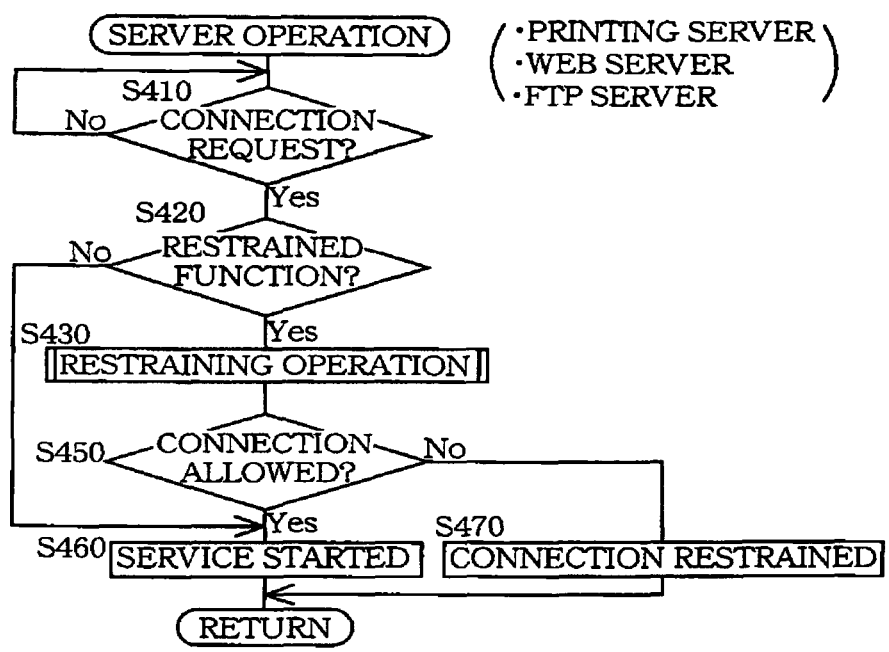
FIG. 20 is a flow chart representing a server operation that is carried out by the multi-function apparatus.

Step S310 is followed by Step S320 where the CPU 111 operates, based on the obtained first and second set information, the display portion 117 to display, as a GUI (graphical user interface) image, an information setting image, as shown in FIG. 19.

The information setting image displayed by the display portion 117 at Step S320 includes a plurality of check boxes corresponding to a plurality of setting items. More specifically described, the setting image includes a check box to select enabling or disabling of the restraining function with respect to accesses to the printing server portion 121a; a check box to select enabling or disabling of the restraining function with respect to accesses to the web server portion 121b; a check box to select enabling or disabling of the restraining function with respect to accesses to the FTP server portion 121c; a check box to select enabling or disabling of the restraining function with respect to accesses with global addresses; and a check box to select enabling or disabling of the restraining function with respect to accesses with local site addresses.

More specifically described, at Step S320, the CPU 111 automatically checks only one or more check boxes corresponding to one or more setting items that are set effective ("enable") in the first and second set information, and operates the display portion 117 to display the information setting image. Step S320 is followed by Step S330 to wait for the user to operate the input portion 118 and thereby input or set information through the same 118. If information is inputted, the CPU 111 judges, at Step S340, whether the inputted information is checking any one of the check boxes, or canceling checking of any one of the check boxes.

If a positive judgment is made at Step S340, the control of the CPU 111 goes to Step S350 to display, or delete, a symbol "✓" in a check box checked or canceled by the user. In addition, the CPU 111 changes, based on the inputted information, enabling or disenabling of a corresponding setting item in the first and second set information obtained at Step S310. This is a temporary setting. Then, the control of the CPU 111 goes back to Step S330.

On the other hand, if a negative judgment is made at Step S340, the control of the CPU 111 goes to Step S360 to judge whether the inputted information is selection of a button "OK" or selection of a button "CANCEL". If the inputted information is the selection of button "OK", the control of the CPU 111 goes to Step S370 to send the first and second set information, temporarily set at Step S350, to the multi-function apparatus 120, according to SNMP, so that the temporarily set information is stored by the apparatus 120.

That is, the first and second set information stored by the NVRAM 124 of the multi-function apparatus 120 is rewritten to the first and second set information temporarily set at Step S350. Then, the CPU 111 ends the setting and changing operation. On the other hand, if the inputted information is the selection of button "CANCEL", the CPU 111 ends the setting and changing operation without going to Step S370.

Next, there will be described an access restraining operation of the multi-function apparatus 120 based on the first and second set information stored by the NVRAM 124 of the apparatus 120. FIG. 10 is a flow chart representing an operation (hereinafter, referred to as the "server" operation) that is carried out by the CPU 121 of the apparatus 120 when the CPU 121 functions as each of the printing server portion 121a, the web server portion 121b, and the FTP server portion 121c.

Respective operations that are carried out by the CPU 121 when the CPU 121 functions as the printing server portion 121a, the web server portion 121b, and the FTP server portion 121c, differ from each other with respect to respective portions thereof that are related to respective basic "server" functions. However, those operations are common with respect to respective portions thereof that are related to respective access restraining functions. Hence, the following description is focused on those access restraining functions in an integrated manner. Here it is assumed that there are respective sockets (or ports) that correspond to the printing server portion 121a, the web server portion 121b, and the FTP server portion 121c.

When the server operation shown in FIG. 10 is started by the CPU 121, first, at Step S410, the CPU 121 judges whether a connection request signal (i.e., a communication signal) to request connection to a port corresponding to a server operation in issue has been received by the multi-function apparatus 120. For example, in the case where the server operation in issue is the operation carried out by the CPU 121 to function as the printing server portion 121a, the CPU 121 judges whether a connection request signal to request connection to the port allotted to the printing server portion 121a has been received.

Likewise, in the case where the server operation in issue is the operation carried out by the CPU 121 to function as the web server portion 121b, the CPU 121 judges whether a connection request signal to request connection to the port allotted to the web server portion 121b has been received; and in the case where the server operation in issue is the operation carried out by the CPU 121 to function as the FTP server portion 121c, the CPU 121 judges whether a connection request signal to request connection to the port allotted to the FTP server portion 121c has been received.

If a positive judgment is made at Step S410, i.e. if it is judged that the network interface 126 has received a connection request signal to request connection to the port in issue, the control of the CPU 121 goes to Step S420 to judge whether the restraining function with respect to the server operation in issue is effective ("enable"). For example, in the case where the server operation in issue is the operation carried out by the CPU 121 to function as the printing server portion 121a, the CPU 121 judges whether a set value that is stored, in the NVRAM 124, with respect to enabling or disabling of the restraining function with respect to accesses to the printing server portion 121a is "enable" indicative of enabling.

Likewise, in the case where the server operation in issue is the operation carried out by the CPU 121 to function as the web server portion 121b, the CPU 121 judges whether a set value that is stored, in the NVRAM 124, with respect to enabling or disabling of the restraining function with respect to accesses to the web server portion 121b is "enable" indicative of enabling; and in the case where the server operation in issue is the operation carried out by the CPU 121 to function as the FTP server portion 121c, the CPU 121 judges whether a set value that is stored, in the NVRAM 124, with respect to enabling or disabling of the restraining function with respect to accesses to the FTP server portion 121c is "enable" indicative of enabling.

If a negative judgment is made at Step S420, i.e., if the restraining function in issue is not "enable", i.e., is "disable" indicative of disabling, the control of the CPU 121 goes to Step S460 to start a "service" operation. The service operation means the proper operation related to the server function in issue. Thus, respective main functions of the printing server portion 121a, the web server portion 121b, and the FTP server portion 121c are performed in the respective server operations. Then, the CPU 121 ends the current server operation, and goes back to Step S410.

On the other hand, if a positive judgment is made at Step S420, i.e., if the restraining function in issue is "enable" indicative of enabling, the control of the CPU 121 goes to Step S430 to carry out a restraining operation represented by a flow chart shown in FIG. 11.

When the restraining operation is started by the CPU 121, first, at Step S431, the CPU 121 extracts an addresser address and an addressee address from the received connection request signal. Then, at Step S433, the CPU 121 judges, based on the first set information stored in the NVRAM 124, whether the restraining function with respect to global addresses is effective. If a negative judgment is made at Step S433, the control of the CPU 121 goes to Step S439 to make a judgment that the requested connection is allowed. Then, the CPU 121 ends the restraining operation.

On the other hand, if a positive judgment is made at Step S433, the control of the CPU 121 goes to Step S435 to judge, based on the first set information stored in the NVRAM 124, whether the restraining function with respect to site local addresses is effective. If a positive judgment is made at Step S435, the control of the CPU 121 goes to Step S437 to judge whether the addresser address extracted at Step S431 is a link local address.

More specifically described, at Step S437, the CPU 121 judges whether the prefix of the addresser address is the prefix (i.e., "fe80::/64") proper to link local addresses, and thereby judges whether the addresser address extracted at Step S431 is a link local address.

If a positive judgment is made at Step S437, the control of the CPU 121 goes to Step S439 to make a judgment that the requested connection is allowed. Then, the CPU 121 ends the restraining operation. On the other hand, if a negative judgment is made at Step S437, the control of the CPU 121 goes to Step S445 to make a judgment that the requested connection is restraining. Then, the CPU 121 ends the restraining operation.

Meanwhile, if the restraining function with respect to site local addresses is not effective, i.e., if a negative judgment is made at Step S435, the control of the CPU 121 goes to Step S441, i.e., a global-address restraining operation represented by a flow chart shown in FIG. 12.

When the global-address restraining operation is started by the CPU 121, first, at Step S510, the CPU 121 judges whether the extracted addresser address is a global address, more specifically described, whether the most significant 3 bits of the prefix of the addresser address is "001".

If a negative judgment is made at Step S510, the control of the CPU 121 goes to Step S540 to make a judgment that an access of the connection requesting node to the multi-function apparatus 120 is an internal access, i.e., an access of a node located in the site local NS to which the apparatus 120 belongs. Then, the CPU 121 ends the global-address restraining operation.

On the other hand, if a positive judgment is made at Step S510, the control of the CPU 121 goes to Step S520 to judge whether the extracted addressee address is a global address, in a basically same manner as that employed at Step S510.

If a negative judgment is made at Step S520, the control of the CPU 121 goes to Step S540 to make a judgment that an access of the connection requesting node is an internal access. Then, the CPU 121 ends the global-address restraining operation. On the other hand, if a positive judgment is made at Step S520, the control of the CPU 121 goes to Step S530 to judge whether the most significant 48 bits of the prefix of the addresser address is identical with those of the prefix of the global address allotted to the multi-function apparatus 120. If a positive judgment is made at Step S530, the control of the CPU 121 goes to Step S540 to make a judgment that an access of the connection requesting node is an internal access.

On the other hand, if a negative judgment is made at Step S530, the control of the CPU 121 goes to Step S550 to make a judgment that an access of the connection requesting node is an external access, i.e., an access of a node located outside the site local NS to which the multi-function apparatus 120 belongs. Then, the CPU 121 ends the global-address restraining operation.

After the global-address restraining operation at Step S441 is ended, the control of the CPU 121 goes to Step S443 (FIG. 11) to judge whether the access of the connection requesting node has been judged as an external access at Step S441. If a positive judgment is made at Step S443, the control of the CPU 121 goes to Step S445 to make a judgment that the connection request is restrained. Then, the CPU 121 ends the restraining operation. On the other hand, if a negative judgment is made at Step S443, i.e., if it is judged at Step S443 that the access of the connection requesting node has been judged as an internal access at Step S441, then the control of the CPU 121 goes to Step S447 to make a judgment that the connection request is allowed. Then, the CPU 121 ends the restraining operation.

After the restraining operation at Step S430 is ended, the control of the CPU 121 goes to Step S450 (FIG. 10) to judge whether the connection request has been allowed at Step S430. If a positive judgment is made at Step S450, the control of the CPU 121 goes to Step S460 to start the service operation and respond to the connection request signal. On the other hand, if a negative judgment is made at Step S450, i.e., if it is judged at Step S450 that the connection request has been restrained at Step S430, then the control of the CPU 121 goes to Step S470 to restrain the connection or access, i.e., send a response signal indicating that the connection request is rejected, to the connection requesting node. Then, the CPU 121 ends the server operation.

Figure 21:
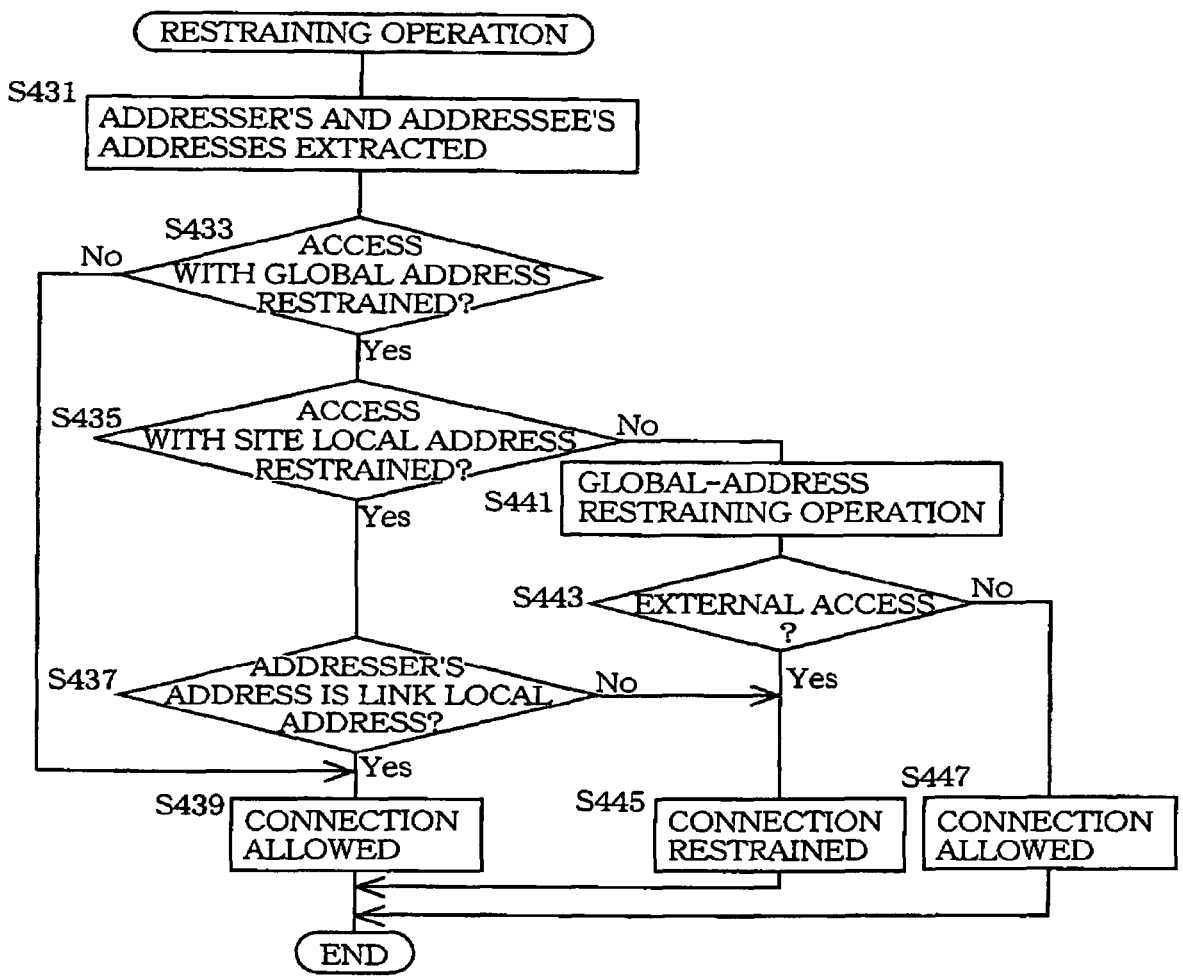
FIG. 21 is a flow chart representing a restraining operation that is carried out by the multi-function apparatus.
Figure 22:
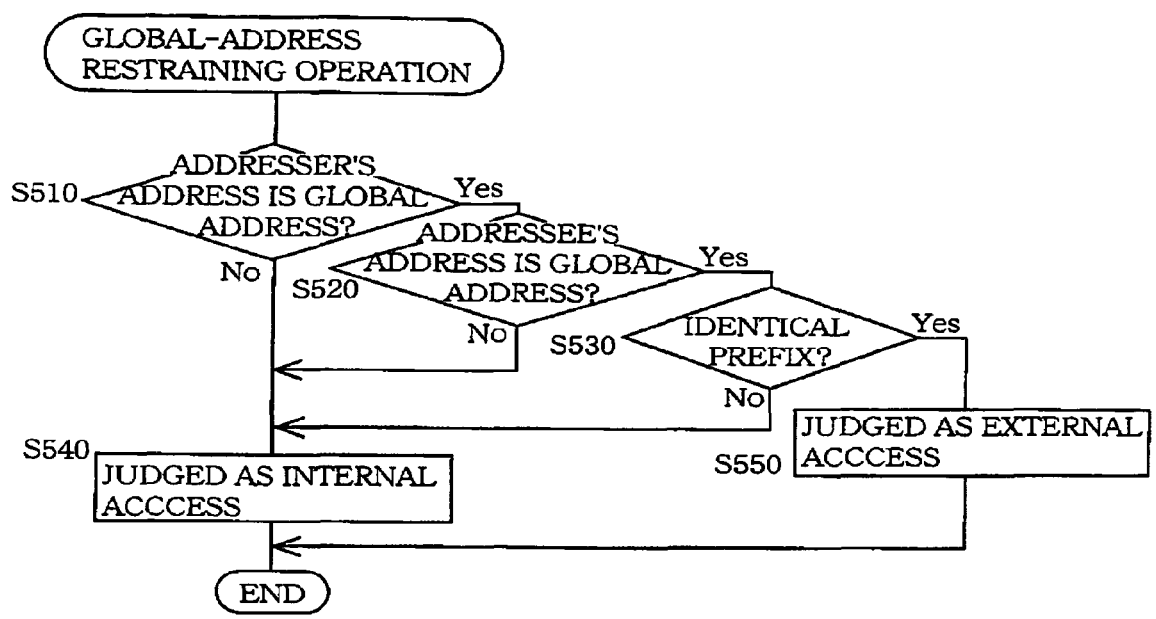
FIG. 22 is a flow chart representing a global-address restraining operation that is carried out by the multi-function apparatus.
Figure 23:
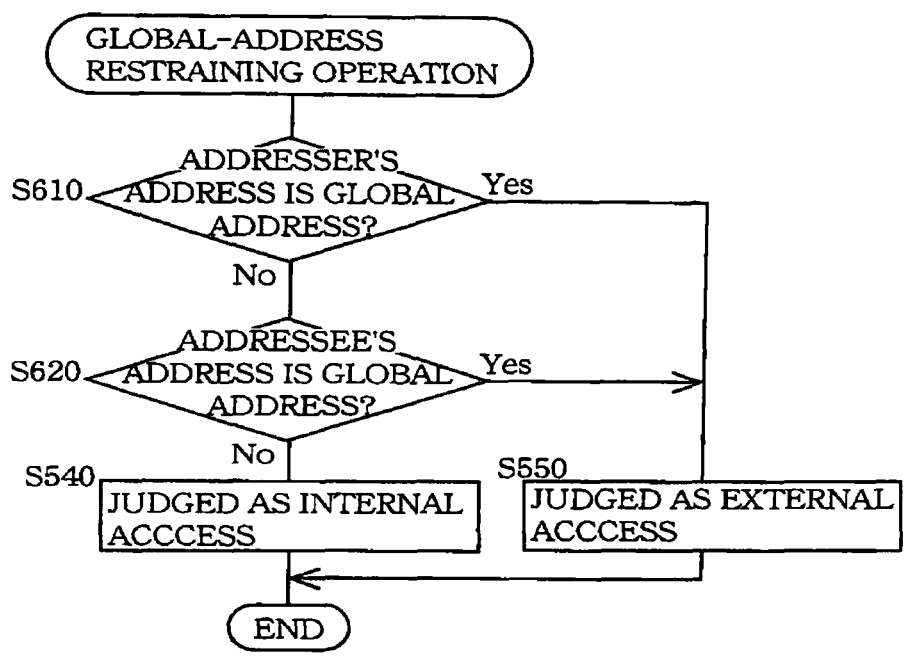
FIG. 23 is a flow chart representing a modified form of the flow chart of FIG. 22 that may be carried out by the multi-function apparatus of FIG. 11.

FIG. 23 shows a modified form of the flow chart shown in FIG. 22 that may be implemented, in place of the flow chart of FIG. 22, by the multi-function apparatus 120 shown in FIG. 11. Steps S610 and S620 of the flow chart of FIG. 23 are identical with the above-described Steps S510 and S520 of the flow chart of FIG. 22, respectively. However, if a positive judgment is made at each of Steps S610 and S620, then the control of the CPU 121 of the apparatus 120 directly goes to Step S540 to make a judgment that an access of the connection requesting node is an internal access; and if a negative judgment is made at each of Steps S610 and S620, then the control of the CPU 121 of the apparatus 120 directly goes to Step S550 to make a judgment that an access of the connection requesting node is an external access, i.e., an access of a node located outside the site local NS to which the multi-function apparatus 120 belongs. Then, the CPU 121 ends the global-address restraining operation of FIG. 23, and goes back to Step S443 of the flow chart of FIG. 21.

As is apparent from the foregoing description of the communication system 101, when the multi-function apparatus 120 receives a communication signal having, as an addresser address, a global address (i.e., when a positive judgment is made at Step S510 or S610), the apparatus 120 makes a judgment (at Step S550) that the received communication signal is an external access, and restrains (at Step S470) the apparatus 120 itself from communicating with a connection requesting node that has sent the communication signal. Thus, the multi-function apparatus 120 can prevent the apparatus 120 itself from being unfairly used by another communication apparatus that does not belong to the local-area network to which the apparatus 120 belongs and belongs to another local-area network as another low-level network of the Internet. This advantage can be achieved without needing to introduce a special server into any networks, or without needing to modify any routers 31, 33 so as to restrain the external accesses or communications. Thus, the restraining function of the multi-function apparatus 120 is highly effective.

In particular, under the environment of IPv6, when the multi-function apparatus 120 is connected to the communication cable LN, the apparatus 120 automatically determines IP addresses therefor and connects itself to the networks. Therefore, if the restraining function with respect to global addresses is enabled as a default value, then the security of the apparatus 120 cannot be lost even when the apparatus 120 is made accessible by other communication apparatuses connected to the Internet, after the user purchased the apparatus 120 and immediately connects the apparatus 120 to the communication cable NL coupled to the Internet.

In addition, even if the received communication signal has, as the addresser address, the global address, the multi-function apparatus 120 judges that the connection requesting node belongs to the local-area network to which the apparatus 120 belongs, if a portion, or an entirety, of the prefix of the addresser address is identical with that of the prefix of the apparatus 120 itself (i.e., a positive judgment is made at Step S530). That is, the apparatus 120 makes a judgment that the received communication signal is an internal access (at Step S540), and does not restrain the apparatus 120 from communicating with the connection requesting node (at Step S470). Likewise, even if the received communication signal has, as the addresser address, the global address, the multi-function apparatus 120 makes a judgment that the received communication signal is an internal access (at Step S540), if the addressee address is not a global address (i.e., a negative judgment is made at Step S520). In this case, too, the apparatus 120 makes a judgment that the received communication signal is an internal access (at Step S540), and does not restrain the apparatus 120 from communicating with the connection requesting node (at Step S470).

Thus, in the present embodiment, if the multi-function apparatus 120 is accessed, in the site local NS to which the apparatus 120 belongs, using not a site local address but a global address, the apparatus 120 does not readily reject the access. Thus, the present apparatus 120 is highly convenient.

In addition, in the present embodiment, the restraining function with respect to site local addresses can be switched between "enable" and "disable" by a remote operation of the PC 110 that functions as an SNMP manager. If the restraining function with respect to site local addresses is enabled (i.e., a positive judgment is made at Step S435), and if the addresser address is a local address, in particular, a site local address (i.e., a negative judgment is made at Step S437), the multi-function apparatus 120 judges that the connection requesting node does not belong to the link local NL to which the apparatus 120 belongs, and belongs to the site local NS as a high-layer network. In this case, the apparatus 120 makes a judgment that the requested connection should be restrained (at Step S445), and restrains the apparatus 120 itself from communicating with the connection requesting node (at Step S470). Thus, the multi-function apparatus 120 is highly effective from the viewpoint of unfair use prevention.

In addition, in the present embodiment, when the multi-function apparatus 120 obtains a communication signal that has been received by the network interface 126 thereof from another node, the apparatus 120 judges, based on the obtained signal, whether the restraining function with respect to each of the printing server portion 121a, the web server portion 121b, and the FTP server portion 121c that carry out respective operations needed for the apparatus 120 to function as respective servers, is enabled or disabled (at Step S420). In this case, if the restraining function is disabled (i.e., a negative judgment is made at Step S420), the apparatus 120 does not reject the connection request at Step S470, i.e., allows the request at Step S460.

If all accesses from the Internet to, e.g., the web server portion 121b are restrained, then the function of the web server portion 121b does not sufficiently work. Hence, in the present embodiment, the multi-function apparatus 120 can be used such that the restraining function with respect to, e.g., the printing server portion 121a is enabled, on one hand, and the restraining function with respect to the web server portion 121b is disabled, on the other hand. That is, the multi-function apparatus 120 can prevent unfair use of one or more functions of all the functions thereof that actually needs or need the prevention of unfair use. Thus, the apparatus 120 is highly convenient to users.

In a communication apparatus in accordance with the present invention, a communication portion is constituted by the network interface 126 and the protocol staff 125; a control portion is constituted by the CPU 121, the ROM 122, the RAM 123, and the NVRAM 124 including the MIB; and an extracting portion of the control portion is constituted by Step S431. In addition, an addresser judging portion of the control portion is constituted by Step S510 or Step S610; and a restraining portion of the control portion is constituted by Steps S450 and S470.

In addition, a network judging portion of the addresser judging portion is constituted by Step S530; and a network-dependent inhibiting portion is constituted by Steps S540 and S550. Moreover, an addressee judging portion of the control portion is constituted by Step S520 or Step 620; and an addressee-dependent inhibiting portion is constituted by Step 540

In addition, a rank judging portion of the addresser judging portion is constituted by Step S437; and a high-rank restraining portion of the restraining portion is constituted by Steps S445 and S470. Moreover, a portion of the control portion that controls the high-rank restraining portion is constituted by the SNAP agent 121d and Step S435; and an operable portion is constituted by the PC 10 functioning as the SNMP manager. A command signal supplied from the operable portion is constituted by the temporarily set first and second information.

An operation performing portion is constituted by each of the printing server portion 121a, the web server portion 121b, and the FTP server portion 121c that obtains the communication signal from the network interface 126, analyzes the obtained signal, and responds to the addresser node; and an operation-performing-portion judging portion is constituted by Step S420 that is carried out by each of the server portions 121a, 121b, 121c. A pre-selected operation performing portion is constituted by one of the server portions 121a, 121b, 121c a restraining function for which is disabled; such as the web server portion (EWS) 121b shown in FIG. 8B.

In addition, an operation-performing-portion-dependent inhibiting portion is constituted by Steps S420 and S460; and an inputted-command-dependent inhibiting portion is constituted by the SNMP agent 121d, S433, and S439.

Though the multi-function apparatus 120 employs the printing (or recording) portion 128 and the printing server portion 121a, the present invention is applicable to such a communication apparatus that employs, in place of the printing portion 128 and the printing server portion 121a, an image reading portion and a reading server portion, a camera portion and a camera server portion, or other functional portions having other functions and corresponding server portions, or a single multi-function apparatus that employs two or more of those functional portions and the corresponding server portions. In addition, the present invention is applicable to such a communication apparatus that employs the printing server portion 121a or the reading server portion and communicates with a printing portion or an image-reading portion, employed by another communication apparatus, so as to exhibit a corresponding function.

In addition, though the multi-function apparatus 120 operates according to IPv6 (internet protocol version 6), the present invention is applicable to such a communication apparatus that operates according to a different protocol, depending upon networks to which the communication apparatus belongs, for example, if the latter protocol is used not only for communications in each of low-level networks and but also for communications between each of the low-level networks and a high-level network.

In the second embodiment shown in FIGS. 11 through 22 and its modified form shown in FIG. 23, the communication portion 125, 126 of the communication apparatus 120 can automatically connect the communication apparatus 120 itself to each of the local-area network and the wide-area network, without needing to wait inputting of a user's command. Since the communication apparatus 120 automatically connects itself to the wide-area network, it is very advantageous for the communication apparatus 120 to employ the above-described, extracting portion, addresser judging portion, and restraining portion.

In the case where the local-area networks and the wide-area network are managed by, e.g., IPv6, each of the local-area addresses and the wide-area addresses includes a prefix as network identifying information, and an address portion other than the prefix, and the respective address portions of the local-area addresses are uniquely allotted to the communication apparatuses 110, 120 in each of the local-area networks. In addition, in the case where the wide-area addresses are, e.g., global IP addresses, the respective prefixes of the wide-area addresses are uniquely allotted to the low-level networks belonging to the wide-area network and including the local-area networks.

More specifically described, in the case where the networks are managed by, e.g., IPv6, the communication portion of each of the communication apparatuses 110, 120 automatically determines, based on, e.g., a MAC (media access control) address, an address portion of each of its own local-area address and wide-area address, produces its own local-area address by adding, to the determined address portion, a prefix identifying a local-area network to which the each communication apparatus belongs, and sets the produced own local-area address in the apparatus itself. Additionally, the communication portion produces its own wide-area address by adding, to the determined address portion, a prefix identifying the wide-area network, and sets the produced own wide-area address in the apparatus itself. Thus, the communication portion of each of the communication apparatuses 110, 120 automatically connects the each apparatus itself to the local-area network and the wide-area network.

Concerning wide-area addresses, there are known a method in which a communication portion of each of a plurality of communication apparatuses obtains a wide-area address from a server device (i.e., a DHCP (dynamic host configuration protocol) server) having a function of automatically allotting addresses, and sets the obtained wide-area address in the each apparatus; and another method in which a communication portion of each of a plurality of communication apparatuses obtains, from a device that belongs to a local-area network to which the each apparatus belongs and has a function of sending a prefix identifying a low-level network that belongs to the wide-area network and corresponds to that local-area network, a prefix identifying that local-area network, produces its own wide-area address by adding the obtained prefix to an address portion determined by itself, and sets the produced own wide-area address in the each apparatus itself.

In the case where the respective prefixes of the wide-area addresses are uniquely allotted to the low-level networks belonging to the wide-area network and including the local-area networks, it is preferred that the communication apparatus 120 be configured such that the address judging portion (S510) judges whether the extracted third addresser identifying information is any one of the wide-area addresses; the network judging portion (S530) judges, when the address judging portion judges that the extracted third addresser identifying information is one of the wide-area addresses, judges, based on the prefix of the one wide-area address as the extracted third addresser identifying information and the prefix of the wide-area address allotted to the communication apparatus 120, whether the third addresser belongs to the local-area network to which the communication apparatus 120 belongs; and the network-dependent inhibiting portion (S540, S447, S450, S460) inhibits, when the network judging portion judges that the third addresser belongs to the local-area network, inhibits the restraining portion (S470) from restraining the communication portion 125, 126 from communicating with the third addresser.

If all accesses with wide-area addresses each as addresser identifying information are restrained without any exceptions, an access with a wide-area address of another communication apparatus belonging to the local-area network to which the present communication apparatus belongs, is restrained. In this case, an access with a local-area address of the different communication apparatus as the addresser to the present communication apparatus is allowed. However, if all the communication apparatuses belonging to the local-area network are designed to use, with priority, the respective wide-area addresses, the above-indicated access restraining manner is not convenient. This problem can be solved by the above-described communication apparatus wherein even if the addresser identifying information is one of the wide-area addresses, the restraining portion is inhibited and the communication portion 125, 126 is allowed to communicate with the addresser, if the addresser belongs to the same low-level network (i.e., the local-area network) as the network to which the present communication apparatus 120 belongs.

Whether the addresser belongs to the local-area network to which the communication apparatus 120 belongs can be judged by judging whether the prefix of the one wide-area address as the addresser identifying information is identical with the prefix of the wide-area address allotted to the communication apparatus 120.

The address judging portion (S510) can judge whether the addresser identifying information identifying the addresser is any one of the wide-area addresses, based on the prefix of one of the local-area addresses and the wide-area addresses that constitutes the addresser identifying information.

More specifically described, if the prefix contains information proper to local-area networks, it can be judged that the addresser identifying information identifying the addresser is a local-area address; and on the other hand, if the prefix does not contain the information proper to the local-area networks (or contains information proper to a wide-area network), it can be judged that the addresser identifying information is a wide-area address.

In the second embodiment and its modified embodiment, when each communication apparatus 110, 120 sends a communication signal to an arbitrary one of the communication apparatuses 110 belonging to a local-area network to which the each communication apparatus belongs, an arbitrary one of (a) the local-area and wide-area addresses allotted to the arbitrary communication apparatus as a first addressee is added as addressee identifying information to the communication signal; and, when the each communication apparatus 110, 120 sends a communication signal to an arbitrary one of the communication apparatuses 110 belonging to another local-area network to which the each communication apparatus does not belong, (b) the wide-area address allotted to the arbitrary communication apparatus as a second addressee is added as addressee identifying information to the communication signal.

In this case, when the communication portion 125, 126 of the communication apparatus 120 receives a communication signal from another communication apparatus 110 as an addresser, the extracting portion (S431) extracts, from the received communication signal, not only the addresser identifying information identifying the addresser, but also addressee identifying information identifying the communication apparatus 120 as an addressee, and the addressee judging portion (S520, S620) judges whether the addressee identifying information is any one of the wide-area addresses and, when the addressee judging portion judges that the extracted addressee identifying information is not any of the wide-area addresses, the addressee-dependent inhibiting portion (S540, S447, S460) inhibits the restraining portion (S470) from restraining the communication portion 125, 126 from communicating with the addresser.

In the above-described communication apparatus 120, even if the addresser identifying information may be a wide-area address, the communication portion 125, 126 is not restrained from communicating with the addresser, if the addressee identifying information is not a wide-area address. In the case where the communication apparatus 120 belongs to a network (e.g., a network managed according to IPv6) that functions as not only a local-area network but also a low-level network belonging to a wide-area network, the apparatus 120 can communicate with another communication apparatus belonging to the same local-area network, using either wide-area addresses or local-area addresses.

Thus, it is possible to use, as addresser identifying information, a wide-area address and use, as addressee identifying information, a local-area address. In this case, the present communication apparatus 120 is effectively prevented from unnecessarily restraining its communication with the addresser located in the same local-area network.

Advantageously, the addressee judging portion (S520, S620) judges whether the extracted addressee identifying information identifying the addressee is a wide-area address, based on the prefix of one of the local-area and wide-area addresses that constitutes the addressee identifying information.

In the second embodiment and its modified embodiment, the addresser judging portion comprises the rank judging portion (S433, S435, S437) which judges whether the extracted addresser identifying information identifying the addresser has a rank higher than a reference rank and, when the rank judging portion judges that the extracted addresser identifying information has the rank higher than the reference rank, the high-rank restraining portion (S445, S470) restrains the communication portion 125, 126 from communicating with the addresser. In addition, the control portion 121 of the communication apparatus 120 controls the operation of the high-rank restraining portion, based on the control command supplied from the operable portion 110 which is operable by a user.

Thus, the communication apparatus 120 belongs to the local-area network wherein the plurality of sorts of local-area addresses are allotted to the respective communication apparatuses, and it can be switched or changed about whether accesses with addresses having a rank higher than the reference rank should be restrained. Thus, the communication apparatus 120 is very convenient. For example, in the case where the communication apparatus 120 belongs to a local-area network managed by IPv6, the low-layer networks belonging to the local-area network correspond to link local networks, and a high-layer network corresponds to, e.g., a site local network or a unique local network.

Though the communication apparatus 120 can extract the addresser identifying information identifying the addresser and restrain the communication with the addresser based on the extracted information, or extract both the addresser identifying information identifying the addresser and the addressee identifying information identifying the addressee and restrain the communication with the addresser based on the extracted information, the apparatus 120 can extract the addressee identifying information identifying the addressee and restrain the communication with the addresser based on the extracted information.

The communication apparatus 120 has the plurality of different functions, i.e., includes the plurality of operation performing portions 121*a*, 121*b*, 121*c* each of which can obtain, from the communication portion 125, 126, a communication signal received from another communication apparatus as an addresser, and performs, based on the obtained communication signal, a corresponding one of the different operations so as to implement a corresponding one of the different functions. In this case, advantageously, the operation-performing-portion judging portion (S410) judges whether one of the operation performing portions that has obtained the received communication signal from the communication portion 125, 126 is a pre-selected operation performing portion, and the operation-performing-portion-dependent inhibiting portion (S420) inhibits, when the operation-performing-portion judging portion judges that the one operation performing portion is the pre-selected operation performing portion, inhibits the restraining portion (S470) from restraining the communication portion 125, 126 from communicating with the addresser.

In the above-described communication apparatus 120, the restraining portion (S470) is inhibited from restraining the communication portion 125, 126 from communicating with the addresser, with respect to only the pre-selected operation performing portion corresponding to, e.g., a function that is mainly aimed at communicating with other communication apparatuses via the wide-area network (e.g., a web server portion).

The communication apparatus 120 further comprising an inputted-command-dependent inhibiting portion (S433, S435) which, when an operation inhibiting command to inhibit an operation of the restraining portion (470) is inputted through the operable portion 110 which is operable by a user, inhibits the restraining portion from restraining the communication portion 125, 126 from communicating with the addresser. Since the user can freely switch the apparatus 120 about whether to inhibit the operation of the restraining portion, the apparatus 120 is very convenient.

In the communication system 101, each of the local-area networks and the wide-area network is managed according to the internet protocol (IP), and each of the wide-area addresses is a global IP address, and each of the local-area addresses is a local IP address.

In the networks managed by, e.g., IPv6, the communication portion 125, 126 of the communication apparatus 120 automatically determines its own global IP address and thereby automatically connects the apparatus 120 itself to the Internet. Therefore, it is very important to restrain accesses to the apparatus 120 from the other communication apparatuses 110 via the Internet, so as to protect the privacy of the user of the apparatus 120.

In a third embodiment of the present invention, the above-described first and second embodiments are combined with each other. For example, the first embodiment is modified such that the WAN communication portion 15 and the LAN communication portion 13 employed in the first embodiment are replaced with the protocol staff 125 and the network interface 126 employed in the second embodiment. Thus, the multi-function apparatus 11 is connected via the network interface 126 to a first local-area network as one of the low-level networks belonging to a wide-area network. In this embodiment, the control portion 39 operates according to the control program represented by the flow charts shown in FIGS. 20, 21, and 22, and functions as each of the extracting portion (S431) which, when the communication portion 125, 126 receives a communication signal from an arbitrary one of the other communication apparatuses 110, extracts, from the received communication signal, addresser identifying information identifying the arbitrary communication apparatus as an addresser; and the addresser judging portion (S437, S443, S450) which judges whether the addresser identified by the extracted addresser identifying information belongs to at least one second local-area network which belongs to the wide-area network and to which the communication apparatus 120 does not belong. When the addresser judging portion judges that the addresser belongs to the at least one second local-area network, the compressing portion (T239, T245, T247, T253) and/or the protecting portion (T237, T241, T251) compresses and/or protects information so that the compressed and/or protected information may be sent to the addresser; and when the addresser judging portion judges that the addresser belongs to the first local-area network, none of the compressing portion (T239, T245, T247, T253) and the protecting portion (T237, T241, T251) compresses or protects information so that the information as it is may be sent to the addresser.

It is to be understood that the present invention may be embodied with various changes and improvements that may occur to a person skilled in the art, without departing from the spirit and scope of the invention defined in the appended claims.

What is claimed is:

1. An information server as one of a plurality of first communication apparatuses belonging to a first communication network, for serving, by transmission, a batch of information to an other first communication apparatus of the plurality of first communication apparatuses via the first communication network, and to at least one second communication apparatus via a second communication network, the information server comprising:
    a communication portion which communicates with said other first communication apparatus via the first communication network, and with said at least one second communication apparatus via the second communication network, wherein the communication portion includes
    a plurality of sorts of communication interfaces which are adapted to be connected to the first and second communication networks, respectively, and
    a request receiving portion which receives, from said other first communication apparatus via the first communication network, a first request to transmit said batch of information to said other first communication apparatus via the first communication network, and additionally receives, from said at least one second communication apparatus via the second communication network, a second request to transmit said batch of information to said at least one second communication apparatus via the second communication network;
    a storing portion which stores said batch of information to be transmitted to each of said other first communication apparatus and said at least one second communication apparatus; and
    a control portion which controls the communication portion, wherein the control portion includes at least one of (A) a compressing portion which reads said batch of information from the storing portion and, when the request receiving portion receives one of the first request and the second request and a first sort of communication interface of the plurality of sorts of communication interfaces is used to transmit the read information that has not been decompressed after being read from the storing portion, compresses the read information so that the first sort of communication interface transmits the compressed information to a corresponding one of said other first communication apparatus and said at least one second communication apparatus via a corresponding one of the first and second communication networks, and when the request receiving portion receives an other of the first request and the second request and a second sort of communication interface different from the first sort of communication interface is used to transmit the read information that has not been decompressed after being read from the storing portion, does not compress the read information so that the second sort of communication interface transmits the read information as it is, to an other of said other first communication apparatus and said at least one second communication apparatus via an other of the first and second communication networks, and
    (B) a protecting portion which reads said batch of information from the storing portion and, when the request receiving portion receives one of the first request and the second request and a first sort of communication interface of the plurality of sorts of communication interfaces is used to transmit the read information that has not been decrypted after being read from the storing portion, protects the read information so that the first sort of communication interface transmits the protected information to a corresponding one of said other first communication apparatus and said at least one second communication apparatus via a corresponding one of the first and second communication networks and, when the request receiving portion receives an other of the first request and the second request and a second sort of communication interface different from the first sort of communication interface is used to transmit the read information that has not been decrypted after being read from the storing portion, does not protect the read information so that the second sort of communication interface transmits the read information as it is, to an other of said other first communication apparatus and said at least one second communication apparatus via an other of the first and second communication networks
    wherein the first and second communication networks have respective different bandwidths, and wherein the control portion includes the compressing portion, and
    wherein the communication portion further includes a compression-stop-command receiving portion which receives, from said corresponding one of said other first communication apparatus and said at least one second communication apparatus via said corresponding one of the first and second communication networks, a compression-stop command to temporarily stop the compression of said batch of information, wherein the compressing portion temporarily stops, according to the received compression-stop command, the compression of said batch of information, so that the first sort of communication interface transmits the read information as it is, to said corresponding one of said other first communication apparatus and said at least one second communication apparatus via said corresponding one of the first and second communication networks.

2. The information server according to claim 1, wherein the first communication network to which the information server as said one first communication apparatus belongs, comprises a local-area network, and the second communication network comprises a wide-area network, and wherein the control portion controls the communication portion to communicate with said other first communication apparatus via the local-area network, and controls the communication portion to communicate with said at least one second communication apparatus via the wide-area network.

3. The information server according to claim 2, wherein the local-area network belongs to the wide-area network.

4. The information server according to claim 1, wherein the first and second communication networks have respective different security levels.

5. The information server according to claim 1, wherein the information server as said one first communication apparatus belongs to, as the first communication network, a first one of a plurality of local-area networks which belong to, as the second communication network, a wide-area network and include, in addition to the first local-area network, at least one second local-area network to which a plurality of said second communication apparatuses belong and the first communication apparatuses including the information server as said one first communication apparatus do not belong, wherein a plurality of different first local-area addresses are allotted to the first communication apparatuses, respectively, so as to identify the first communication apparatuses from each other, and a plurality of second local-area addresses are allotted to the second communication apparatuses, respectively, so as to identify the second communication apparatuses from each other, wherein a plurality of different wide-area addresses are allotted to the first and second communication apparatuses, respectively, so as to identify the first and second communication apparatuses from each other, wherein each of the first and second communication apparatuses includes the communication portion which, when said each communication apparatus as a first addresser sends a first communication signal to a first arbitrary one of the communication apparatuses belonging to one of the first and second local-area networks to which said each communication apparatus belongs, adds, as first addresser identifying information identifying the first addresser, an arbitrary one of (a) one of the first and second local-area addresses that is allotted to said each communication apparatus and (b) the wide-area address allotted to said each communication apparatus, to the first communication signal, and which, when said each communication apparatus as a second addresser sends a second communication signal to a second arbitrary one of the communication apparatuses belonging to an other of the first and second local-area networks to which said each communication apparatus does not belong, adds, as second addresser identifying information identifying the second addresser, the wide-area address allotted to said each communication apparatus, to the second communication signal, wherein the information server as said one first communication apparatus comprises a corresponding one of the respective communication portions of the first communication apparatuses, wherein the control portion of the information server as said one first communication apparatus comprises an extracting portion which, when said one communication portion receives a third communication signal from a third arbitrary one of the first and second communication apparatuses, extracts, from the received third communication signal, third addresser identifying information identifying the third arbitrary communication apparatus as a third addresser;

an addresser judging portion which judges whether the third addresser identified by the extracted third addresser identifying information belongs to said at least one second local-area network; and a restraining portion which, when the addresser judging portion judges that the third addresser belongs to said at least one second local-area network, restrains said one communication portion from communicating with the third addresser.

6. The information server according to claim 1, wherein the compressing portion compresses said batch of information such that the compressed information is reversible, the compressed information being convertible into an original form thereof.

7. The information server according to claim 6, wherein the compressing portion reversibly compresses said batch of information according to a reversible-compression algorithm comprising a gzip (RFC 1952).

8. The information server according to claim 1, wherein the compressing portion compresses said batch of information such that the compressed information is irreversible, the compressed information being not convertible into an original form thereof.

9. The information server according to claim 8, wherein the compressing portion irreversibly compresses said batch of information by deleting at least one redundant portion of the information.

10. The information server according to claim 8, wherein said batch of information comprises a batch of image information, and wherein the compressing portion irreversibly compresses said batch of image information according to an irreversible-compression algorithm comprising a JPEG (ISO/IEC 10918-1).

11. The information server according to claim 8, wherein said batch of information comprises a batch of image information having a first degree of resolution, and wherein the compressing portion irreversibly compresses said batch of image information by converting said batch of image information such that the first degree of resolution thereof is changed to a second degree of resolution lower than the first degree of resolution.

12. The information server according to claim 1, wherein the communication portion further includes a compression-degree receiving portion which receives, from said corresponding one of said other first communication apparatus and said at least one second communication apparatus via said corresponding one of the first and second communication networks, a compression-degree signal representing a requested compression degree, wherein the compressing portion compresses said batch of information according to the requested compression degree represented by the received compression-degree signal.

13. The information server according to claim 1, wherein the first and second communication networks have respective different security levels, wherein the control portion further includes the protecting portion.

14. The information server according to claim 13, wherein the protecting portion protects said batch of information by coding said batch of information.

15. The information server according to claim 13, wherein the protecting portion protects said batch of information by inhibiting an image represented by said batch of information from being printed.

16. The information server according to claim 13, wherein the communication portion further includes a protection-stop-command receiving portion which receives, from said corresponding one of said other first communication apparatus and said at least one second communication apparatus via said corresponding one of the first and second communication networks, a protection-stop command to temporarily stop the protection of said batch of information, wherein the protecting portion temporarily stops, according to the received protection-stop command, the protection of said batch of information, so that the first sort of communication interface transmits said batch of information, to said corresponding one of said other first communication apparatus and said at least one second communication apparatus via said corresponding one of the first and second communication networks.

17. The information server according to claim 1, wherein the communication portion further includes a router portion which routes said batch of information between the plurality of sorts of communication interfaces.

18. The information server according to claim 1, further comprising a printer portion which prints, on a printing medium, at least one image represented by at least one of said batch of information stored by the storing portion and a batch of information received by the communication portion.

19. The information server according to claim 1, further comprising a scanner portion which reads an image printed on a printing medium and performs at least one of (a) a first operation to cause the storing portion to store a batch of information representing the read image and (b) a second operation to cause the communicating portion to transmit a batch of information representing the read image.

20. The information server according to claim 1, further comprising a facsimile portion which transmits, via a telephone line, at least one of (a) said batch of information stored by the storing portion and (b) a batch of information received by the communication portion, to at least one communication apparatus other than said other first communication apparatus and said at least one second communication apparatus.

21. A communication apparatus as one of a plurality of first communication apparatuses belonging to a first one of a plurality of local-area networks which belong to a wide-area network and include, in addition to the first local-area network, at least one second local-area network to which a plurality of second communication apparatuses belong and the plurality of first communication apparatuses do not belong, the communication apparatus as said one first communication apparatus comprising:

a communication portion which communicates with at least one other first communication apparatus of the plurality of first communication apparatuses via the first local-area network, and with at least one second communication apparatus of the plurality of second communication apparatuses via (a) at least one first router provided between the first local-area network and the wide-area network, (b) the wide-area network, (c) at least one second router provided between the wide-area network and said at least one second local-area network, and (d) said at least one second local-area network; and a processor configured to provide a control portion which controls the communication portion, wherein a plurality of different first local-area addresses are allotted to the first communication apparatuses, respectively, so as to identify the first communication apparatuses from each other, and a plurality of second local-area addresses are allotted to the second communication apparatuses, respectively, so as to identify the second communication apparatuses from each other, wherein a plurality of different wide-area addresses are allotted to the first and second communication apparatuses, respectively, so as to identify the first and second communication apparatuses from each other, wherein each of the first and second communication apparatuses includes the communication portion which, when said each communication apparatus as a first addresser sends a first communication signal to a first arbitrary one of the communication apparatuses belonging to one of the first and second local-area networks to which said each communication apparatus belongs, adds, as first addresser identifying information identifying the first addresser, an arbitrary one of (a) one of the first and second local-area addresses that is allotted to said each communication apparatus and (b) the wide-area address allotted to said each communication apparatus, to the first communication signal, and which, when said each communication apparatus as a second addresser sends a second communication signal to a second arbitrary one of the communication apparatuses belonging to an other of the first and second local-area networks to which said each communication apparatus does not belong, adds, as second addresser identifying information identifying the second addresser, the wide-area address allotted to said each communication apparatus, to the second communication signal, wherein the communication apparatus as said one first communication apparatus comprises a corresponding one of the respective communication portions of the first communication apparatuses, wherein the control portion of the communication apparatus as said one first communication apparatus comprises an extracting portion which, when said one communication portion of the communication apparatus as said one first communication apparatus receives a third communication signal from a third arbitrary one of the first and second communication apparatuses, extracts, from the received third communication signal, third addresser identifying information identifying the third arbitrary communication apparatus as a third addresser;

an addresser judging portion which judges whether the third addresser identified by the extracted third addresser identifying information belongs to said at least one second local-area network to which the communications apparatus of said one first communication apparatus does not belong; and a restraining portion which, when the addresser judging portion judges that the third addresser belongs to said at least one second local-area network, restrains said one communication portion of the communication apparatus as said one first communication apparatus from communicating with the third addresser.

22. The communication apparatus according to claim 21, wherein the addresser judging portion judges whether the extracted third addresser identifying information identifying the third addresser is any one of the wide-area addresses and, when the addresser judging portion judges that the extracted third addresser identifying information is one of the wide-area addresses, the restraining portion restrains said one communication portion from communicating with the third addresser.

23. The communication apparatus according to claim 21, wherein said each of the first and second communication apparatuses includes the communication portion which, when said each communication apparatus sends the first communication signal to, as a first addressee, the first arbitrary one of the communication apparatuses belonging to said one of the first and second local-area networks to which said each communication apparatus belongs, adds, as first addressee identifying information identifying the first addressee, an arbitrary one of (a) one of the first and second local-area addresses that is allotted to the first arbitrary communication apparatus and (b) the wide-area address allotted to the first arbitrary communication apparatus, to the first communication signal, and which, when said each communication apparatus sends the second communication signal to, as a second addressee, the second arbitrary one of the communication apparatuses belonging to said other of the first and second local-area networks to which said each communication apparatus does not belong, adds, as second addressee identifying information identifying the second addressee, the wide-area address allotted to the second arbitrary communication apparatus, to the second communication signal, wherein when said one communication portion of the communication apparatus as said one first communication apparatus receives the third communication signal from the third addresser as the third arbitrary one of the first and second communication apparatuses, the extracting portion extracts, from the received third communication signal, third addressee identifying information identifying said one first communication apparatus as a third addressee, and wherein the control portion of the communication apparatus as said one first communication apparatus further comprises an addressee judging portion which judges whether the extracted third addressee identifying information identifying the third addressee is any one of the wide-area addresses and, when the addressee judging portion judges that the extracted third addressee identifying information is one of the wide-area addresses, the restraining portion restrains said one communication portion from communicating with the third addresser.

24. The communication apparatus according to claim 1, wherein said one communication portion automatically connects the communication apparatus as said one first communication apparatus, to each of the first local-network and the wide-area network.

25. The communication apparatus according to claim 21, wherein each of the first and second local-area addresses and the wide-area addresses includes a prefix as network identifying information, and an address portion other than the prefix, and wherein the respective address portions of the first local-area addresses are uniquely allotted to the first communication apparatuses in the first local-area network, and the respective address portions of the second local-area addresses are uniquely allotted to the second communication apparatuses in the second local-area network.

26. The communication apparatus according to claim 25, wherein the respective prefixes of the wide-area addresses are uniquely allotted to a plurality of low-level networks which belong to the wide-area network and include the first and second local-area networks.

27. The communication apparatus according to claim 26, wherein the addresser judging portion comprises:

an address judging portion which judges whether the extracted third addresser identifying information is any one of the wide-area addresses; and a network judging portion which, when the address judging portion judges that the extracted third addresser identifying information is one of the wide-area addresses, judges, based on the prefix of said one wide-area address as the extracted third addresser identifying information and the prefix of the wide-area address allotted to the communication apparatus as said one first communication apparatus, whether the third addresser belongs to the first local-area network to which said one first communication apparatus belongs; and a network-dependent inhibiting portion which, when the network judging portion judges that the third addresser belongs to the first local-area network, inhibits the restraining portion from restraining said one communication portion from communicating with the third addresser.

28. The communication apparatus according to claim 27, wherein the address judging portion judges whether the extracted third addresser identifying information is any one of the wide-area addresses, based on the prefix of one of the first and second local-area addresses and the wide-area addresses that constitutes the extracted third addresser identifying information identifying the third addresser.

29. The communication apparatus according to claim 25, wherein when said each of the first and second communication apparatuses sends the first communication signal to the first arbitrary one of the communication apparatuses belonging to said one of the first and second local-area networks to which said each communication apparatus belongs, the communication portion of said each communication apparatus as the first addresser adds, as first addressee identifying information, an arbitrary one of (a) one of the first and second local-area addresses that is allotted to the first arbitrary communication apparatus as a first addressee and (b) the wide-area address allotted to the first arbitrary communication apparatus, to the first communication signal, and, when said each communication apparatus as the second addresser sends the second communication signal to the second arbitrary one of the communication apparatuses belonging to said other of the first and second local-area networks to which said each communication apparatus does not belong, the communication portion of said each communication apparatus adds, as second addressee identifying information, the wide-area address allotted to the second arbitrary communication apparatus as a second addressee, to the second communication signal, wherein when said one communication portion of the communication apparatus as said one first communication apparatus receives the third communication signal from the third arbitrary one of the first and second communication apparatuses, the extracting portion extracts, from the received third communication signal, not only the third addresser identifying information identifying the third arbitrary communication apparatus as the third addresser, but also third addressee identifying information identifying said one first communication apparatus as a third addressee, and wherein the control portion of the communication apparatus as said one first communication apparatus further includes:

an addressee judging portion which judges whether the extracted third addressee identifying information is any one of the wide-area addresses, based on the prefix of one of the first and second local-area addresses and the wide-area addresses that constitutes the extracted third addressee identifying information identifying the third addressee; and an addressee-dependent inhibiting portion which, when the addressee judging portion judges that the extracted third addressee identifying information is not any of the wide-area addresses, inhibits the restraining portion from restraining said one communication portion from communicating with the third addresser.

30. The communication apparatus according to claim 21, wherein when said each of the first and second communication apparatuses sends the first communication signal to the first arbitrary one of the communication apparatuses belonging to said one of the first and second local-area networks to which said each communication apparatus belongs, the communication portion of said each communication apparatus as the first addresser adds, as first addressee identifying information, an arbitrary one of (a) one of the first and second local-area addresses that is allotted to the first arbitrary communication apparatus as a first addressee and (b) the wide-area address allotted to the first arbitrary communication apparatus, to the first communication signal, and, when said each communication apparatus as the second addresser sends the second communication signal to the second arbitrary one of the communication apparatuses belonging to said other of the first and second local-area networks to which said each communication apparatus does not belong, the communication portion of said each communication apparatus adds, as second addressee identifying information, the wide-area address allotted to the second arbitrary communication apparatus as a second addressee, to the second communication signal, wherein when said one communication portion of the communication apparatus as said one first communication apparatus receives the third communication signal from the third arbitrary one of the first and second communication apparatuses, the extracting portion extracts, from the received third communication signal, not only the third addresser identifying information identifying the third arbitrary communication apparatus as the third addresser, but also third addressee identifying information identifying said one first communication apparatus as a third addressee, and wherein the control portion of the communication apparatus as said one first communication apparatus further comprises:

an addressee judging portion which judges whether the extracted third addressee identifying information is any one of the wide-area addresses; and an addressee-dependent inhibiting portion which, when the addressee judging portion judges that the extracted third addressee identifying information is not any of the wide-area addresses, inhibits the restraining portion from restraining said one communication portion from communicating with the third addresser.

31. The communication apparatus according to claim 21, wherein the communication apparatus as said one first communication apparatus belongs to the first local-area network as a first one of a plurality of low-layer networks which belong to one of a plurality of low-level networks belonging to the wide-area network and include, in addition to the first local-area network as the first low-layer network, at least one second low-layer network to which a plurality of third communication apparatuses belong and the first communication apparatuses do not belong, wherein a plurality of different third local-area addresses are allotted to the plurality of third communication apparatuses, respectively, so as to identify the third communication apparatuses from each other, the first and third local-area addresses having a first rank, wherein a plurality of different intermediate-area addresses are allotted to the first and third communication apparatuses, respectively, so as to identify the first and third communication apparatuses from each other, the intermediate-area addresses having a second rank higher than the first rank, wherein the plurality of different wide-area addresses are allotted to the first, second, and third communication apparatuses, respectively, so as to identify the first, second, and third communication apparatuses from each other, the wide-area addresses having a third rank higher than the second rank, wherein each of the first and third communication apparatuses includes the communication portion which, when said each communication apparatus as a fourth addresser sends a fourth communication signal to a fourth arbitrary one of the communication apparatuses belonging to one of the first and second low-layer networks to which said each communication apparatus belongs, adds, as fourth addresser identifying information identifying the fourth addresser, an arbitrary one of (a) one of the first and third local-area addresses that is allotted to said each communication apparatus and (b) the intermediate-area address allotted to said each communication apparatus, to the fourth communication signal, and which, when said each communication apparatus as a fifth addresser sends a fifth communication signal to a fifth arbitrary one of the communication apparatuses belonging to an other of the first and second low-layer networks to which said each communication apparatus does not belong, adds, as fifth addresser identifying information identifying the fifth addresser, the intermediate-area address allotted to said each communication apparatus, to the fifth communication signal, wherein when said one communication portion of the communication apparatus as said first communication apparatus receives the third communication signal from the third arbitrary one of the first, second, and third communication apparatuses, the extracting portion extracts, from the received third communication signal, the third addresser identifying information identifying the third addresser, wherein the addresser judging portion comprises a rank judging portion which judges whether the extracted third addresser identifying information has a rank higher than a reference rank, and wherein the restraining portion includes a high-rank restraining portion which, when the rank judging portion judges that the extracted third addresser identifying information has the rank higher than the reference rank, restrains said one communication portion from communicating with the third addresser.

32. The communication apparatus according to claim 31, wherein the control portion of the communication apparatus as said first communication apparatus controls an operation of the high-rank restraining portion, based on a control command supplied from an operable portion which is operable by a user.

33. The communication apparatus according to claim 21, further comprising a plurality of operation performing portions each of which can obtain, from said one communication portion, the third communication signal received from the third arbitrary communication apparatus as the third addresser, and performs, based on the obtained third communication signal, a corresponding one of a plurality of different operations so as to implement a corresponding one of a plurality of different functions of the communication apparatus as said one first communication apparatus,
wherein said one communication portion comprises:
an operation-performing-portion judging portion which, when the third communication signal has been received from the third addresser, judges whether one of the operation performing portions that has obtained the received third communication signal from said one communication portion is a pre-selected operation performing portion; and
an operation-performing-portion-dependent inhibiting portion which, when the operation-performing-portion judging portion judges that said one operation performing portion is the pre-selected operation performing portion, inhibits the restraining portion from restraining said one communication portion from communicating with the third addresser.

34. The communication apparatus according to claim 21, further comprising an inputted-command-dependent inhibiting portion which, when an operation inhibiting command to inhibit an operation of the restraining portion is inputted through an operable portion which is operable by a user, inhibits the restraining portion from restraining said one communication portion from communicating with the third addresser.

35. The communication apparatus according to claim 21, wherein each of the first and second local-area networks and the wide-area network is managed according to an internet protocol (IP), and wherein each of the wide-area addresses comprises a global IP address, and each of the first and second local-area addresses comprises a local IP address.

36. An information server as one of a plurality of first communication apparatuses belonging to a first communication network, for serving, by transmission, a batch of information to an other first communication apparatus of the plurality of first communication apparatuses via the first communication network, and to at least one second communication apparatus via a second communication network, the information server comprising:
a communication portion which communicates with said other first communication apparatus via the first communication network, and with said at least one second communication apparatus via the second communication network, wherein the communication portion includes
a plurality of sorts of communication interfaces which are adapted to be connected to the first and second communication networks, respectively, and
a request receiving portion which receives, from said other first communication apparatus via the first communication network, a first request to transmit said batch of information to said other first communication apparatus via the first communication network, and additionally receives, from said at least one second communication apparatus via the second communication network, a second request to transmit said batch of information to said at least one second communication apparatus via the second communication network;
a storing portion which stores said batch of information to be transmitted to each of said other first communication apparatus and said at least one second communication apparatus; and
a control portion which controls the communication portion, wherein the control portion includes at least one of
(A) a compressing portion which reads said batch of information from the storing portion and, when the request receiving portion receives one of the first request and the second request and a first sort of communication interface of the plurality of sorts of communication interfaces is used to transmit the read information that has not been decompressed after being read from the storing portion, compresses the read information so that the first sort of communication interface transmits the compressed information to a corresponding one of said other first communication apparatus and said at least one second communication apparatus via a corresponding one of the first and second communication networks, and when the request receiving portion receives an other of the first request and the second request and a second sort of communication interface different from the first sort of communication interface is used to transmit the read information that has not been decompressed after being read from the storing portion, does not compress the read information so that the second sort of communication interface transmits the read information as it is, to an other of said other first communication apparatus and said at least one second communication apparatus via an other of the first and second communication networks, and
(B) a protecting portion which reads said batch of information from the storing portion and, when the request receiving portion receives one of the first request and the second request and a first sort of communication interface of the plurality of sorts of communication interfaces is used to transmit the read information that has not been decrypted after being read from the storing portion, protects the read information so that the first sort of communication interface transmits the protected information to a corresponding one of said other first communication apparatus and said at least one second communication apparatus via a corresponding one of the first and second communication networks and, when the request receiving portion receives an other of the first request and the second request and a second sort of communication interface different from the first sort of communication interface is used to transmit the read information that has not been decrypted after being read from the storing portion, does not protect the read information so that the second sort of communication interface transmits the read information as it is, to an other of said other first communication apparatus and said at least one second communication apparatus via an other of the first and second communication networks,
wherein the first and second communication networks have respective different security levels, and wherein the control portion includes the protecting portion,
wherein the communication portion further includes a protection-stop-command receiving portion which receives, from said corresponding one of said other first communication apparatus and said at least one second communication apparatus via said corresponding one of the first and second communication networks, a protection-stop command to temporarily stop the protection of said batch of information, wherein the protecting portion temporarily stops, according to the received protection-stop command, the protection of said batch of information, so that the first sort of communication interface transmits the read information as it is, to said corresponding one of said other first communication apparatus and said at least one second communication apparatus via said corresponding one of the first and second communication networks.

37. The information server according to claim 36, wherein the protecting portion protects said batch of information by coding said batch of information.

38. The information server according to claim 36, wherein the protecting portion protects said batch of information by inhibiting an image represented by said batch of information from being printed.

39. A communication apparatus as one of a plurality of first communication apparatuses belonging to a first local-area network as one of a plurality of low-level networks which belong to a wide-area network and include, in addition to the first local-area network, at least one second local-area network to which a plurality of second communication apparatuses belong and the first communication apparatuses do not belong,
- wherein the communication apparatus as said one first communication apparatus communicates with at least one other first communication apparatus of the plurality of first communication apparatuses via the first local-area network, and with at least one second communication apparatus of the plurality of second communication apparatuses via (a) at least one first router provided between the first local-area network and the wide-area network, (b) the wide-area network, (c) at least one second router provided between the wide-area network and said at least one second local-area network, and (d) said at least one local-area network,
- wherein a plurality of different first local-area addresses are allotted to the plurality of first communication apparatuses, respectively, so as to identify the first communication apparatuses from each other, and a plurality of different second local-area addresses are allotted to the plurality of second communication apparatuses, respectively, so as to identify the second communication apparatuses from each other,
- wherein a plurality of different wide-area addresses are allotted to the first and second communication apparatuses, respectively, so as to identify the first and second communication apparatuses from each other,
- wherein each of the first and second communication apparatuses includes a communication portion which, when said each communication apparatus as a first addresser sends a first communication signal to a first arbitrary one of the communication apparatuses belonging to one of the first and second local-area networks to which said each communication apparatus belongs, adds, as first addresser identifying information identifying the first addresser, an arbitrary one of (a) one of the first and second local-area addresses that is allotted to said each communication apparatus and (b) the wide-area address allotted to said each communication apparatus, to the first communication signal, and which, when said each communication apparatus as a second addresser sends a second communication signal to a second arbitrary one of the communication apparatuses belonging to an other of the first and second local-area networks to which said each communication apparatus does not belong, adds, as second addresser identifying information identifying the second addresser, the wide-area address allotted to said each communication apparatus, to the second communication signal,
- the communication apparatus as said one first communication apparatus comprising:
- a corresponding one of the respective communication portions of the first communication apparatuses; and
- a processor configured to provide:
  - an extracting portion which, when said one communication portion of the communication apparatus as said one first communication apparatus receives a third communication signal from a third arbitrary one of the first and second communication apparatuses, extracts, from the received third communication signal, third addresser identifying information identifying the third arbitrary communication apparatus as a third addresser;
  - an addresser judging portion which judges whether the extracted third addresser identifying information is any one of the wide-area addresses; and
  - a restraining portion which, when the addresser judging portion judges that the extracted third addresser identifying information is one of the wide-area addresses, restrains said one communication portion of the communication apparatus as said one first communication apparatus from communicating with the third addresser.

40. A communication apparatus as one of a plurality of first communication apparatuses belonging to a first local-area network as one of a plurality of low-level networks which belong to a wide-area network and include, in addition to the first local-area network, at least one second local-area network to which a plurality of second communication apparatuses belong and the first communication apparatuses do not belong,
- wherein the communication apparatus as said one first communication apparatus communicates with at least one other first communication apparatus of the plurality of first communication apparatuses via the first local-area network, and with at least one second communication apparatus of the plurality of second communication apparatuses via (a) at least one first router provided between the first local-area network and the wide-area network, (b) the wide-area network, (c) at least one second router provided between the wide-area network and said at least one second local-area network, and (d) said at least one local-area network,
- wherein a plurality of different first local-area addresses are allotted to the plurality of first communication apparatuses, respectively, so as to identify the first communication apparatuses from each other, and a plurality of different second local-area addresses are allotted to the plurality of second communication apparatuses, respectively, so as to identify the second communication apparatuses from each other,
- wherein a plurality of different wide-area addresses are allotted to the first and second communication apparatuses, respectively, so as to identify the first and second communication apparatuses from each other,
- wherein each of the first and second communication apparatuses includes a communication portion which, when said each communication apparatus sends a first communication signal to a first arbitrary one of the communication apparatuses belonging to one of the first and second local-area networks to which said each communication apparatus belongs, adds, as first addressee identifying information, an arbitrary one of (a) one of the first and second local-area addresses that is allotted to the first arbitrary communication apparatus as a first addressee and (b) the wide-area address allotted to the first arbitrary communication apparatus, to the first communication signal, and which, when said each communication apparatus sends a second communication signal to a second arbitrary one of the communication apparatuses belonging to an other of the first and second local-area networks to which said each communication apparatus does not belong, adds, as second addressee identifying information, the wide-area address allotted to the second arbitrary communication apparatus as a second addressee, to the second communication signal, the communication apparatus as said one first communication apparatus comprising:

a corresponding one of the respective communication portions of the first communication apparatuses; and a processor configured to provide:

an extracting portion which, when said one communication portion of the communication apparatus as said one first communication apparatus receives a third communication signal from a third arbitrary one of the first and second communication apparatuses, extracts, from the received third communication signal, third addressee identifying information identifying, as a third addressee, the communication apparatus as said one first communication apparatus;

an addressee judging portion which judges whether the extracted third addressee identifying information is any one of the wide-area addresses; and a restraining portion which, when the addressee judging portion judges that the extracted third addressee identifying information is one of the wide-area addresses, restrains said one communication portion of the communication apparatus as said one first communication apparatus from communicating with the third arbitrary communication apparatus.

* * * * *